(12) United States Patent
Kim et al.

(10) Patent No.: US 12,101,422 B2
(45) Date of Patent: Sep. 24, 2024

(54) ELECTRONIC DEVICE INCLUDING SENSOR PANEL

(71) Applicant: Samsung Electronics Co., Ltd., Gyeonggi-do (KR)

(72) Inventors: Yongwoon Kim, Gyeonggi-do (KR); Eunsoo Park, Gyeonggi-do (KR); Hyunsuk Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 357 days.

(21) Appl. No.: 17/720,724

(22) Filed: Apr. 14, 2022

(65) Prior Publication Data
US 2022/0345555 A1 Oct. 27, 2022

Related U.S. Application Data

(63) Continuation of application No. PCT/KR2022/004755, filed on Apr. 4, 2022.

(30) Foreign Application Priority Data

Apr. 22, 2021 (KR) ........................ 10-2021-0052268

(51) Int. Cl.
*H04M 1/02* (2006.01)
*G06F 1/16* (2006.01)
(Continued)

(52) U.S. Cl.
CPC ........ *H04M 1/0266* (2013.01); *G06F 1/1656* (2013.01); *G06F 3/0446* (2019.05);
(Continued)

(58) Field of Classification Search
None
See application file for complete search history.

(56) References Cited

U.S. PATENT DOCUMENTS

| 10,083,336 | B2 | 9/2018 | Han et al. |
| 10,684,650 | B2 | 6/2020 | Sim et al. |

(Continued)

FOREIGN PATENT DOCUMENTS

| KR | 1020160141169 | 12/2016 |
| KR | 1796660 | 11/2017 |

(Continued)

OTHER PUBLICATIONS

International Search Report dated Jul. 25, 2022 issued in counterpart application No. PCT/KR2022/004755, 3 pages.

*Primary Examiner* — Pablo N Tran
(74) *Attorney, Agent, or Firm* — The Farrell Law Firm, P.C.

(57) ABSTRACT

An electronic device is provided, which includes a housing, a display, and a sensor panel that is disposed between the display and the housing and that senses input information of a stylus pen, in which the sensor panel includes a first sensor panel including an opening area and a second sensor panel disposed to cover at least part of the opening area and electrically connected with the first sensor panel, and the second sensor panel includes a first circuit board including a first sub-board and a second sub-board, at least part of the first sub-board and at least part of the second sub-board being spaced apart from each other to form a receiving space and a second circuit board, at least part of which being accommodated in the receiving space and surrounded by the first circuit board.

20 Claims, 23 Drawing Sheets

(51) Int. Cl.
*G06F 3/041* (2006.01)
*G06F 3/044* (2006.01)
*G06V 40/13* (2022.01)

(52) U.S. Cl.
CPC ...... *G06V 40/1306* (2022.01); *H04M 1/0277* (2013.01); *G06F 2203/04111* (2013.01); *H04M 2201/06* (2013.01); *H04M 2201/38* (2013.01)

(56) References Cited

U.S. PATENT DOCUMENTS

| | | | |
|---|---|---|---|
| 10,809,861 B2 * | 10/2020 | Kim | G06F 3/04146 |
| 10,824,840 B2 | 11/2020 | Song et al. | |
| 11,243,645 B2 | 2/2022 | Kim et al. | |
| 11,360,728 B2 * | 6/2022 | Kim | G06F 3/04883 |
| 11,710,338 B2 * | 7/2023 | Kim | G06F 1/1626 |
| | | | 361/679.55 |
| 11,848,306 B2 * | 12/2023 | Min | H04N 25/75 |
| 11,907,459 B2 * | 2/2024 | Noguchi | G06F 3/041661 |
| 2016/0350570 A1 | 12/2016 | Han et al. | |
| 2018/0052359 A1 * | 2/2018 | Umemoto | G09F 9/30 |
| 2018/0329558 A1 * | 11/2018 | Park | G02F 1/13338 |
| 2019/0095077 A1 * | 3/2019 | Mori | G06F 1/1626 |
| 2019/0317627 A1 | 10/2019 | Kim et al. | |
| 2020/0019268 A1 | 1/2020 | Zhu et al. | |
| 2020/0045826 A1 | 2/2020 | Wang et al. | |
| 2020/0064968 A1 | 2/2020 | Kim et al. | |
| 2020/0363892 A1 * | 11/2020 | Kim | G06F 3/0354 |
| 2021/0004124 A1 | 1/2021 | Park | |
| 2021/0042495 A1 | 2/2021 | Song et al. | |
| 2022/0334715 A1 * | 10/2022 | Cho | G06F 3/04817 |
| 2024/0031467 A1 * | 1/2024 | Jung | H04M 1/72403 |

FOREIGN PATENT DOCUMENTS

| | | |
|---|---|---|
| KR | 1020180127705 | 11/2018 |
| KR | 1020190119366 | 10/2019 |
| KR | 1020200019305 | 2/2020 |
| KR | 1020210005437 | 1/2021 |

\* cited by examiner

ELECTRONIC DEVICE INCLUDING SENSOR PANEL

CROSS-REFERENCE TO RELATED APPLICATIONS

This application is a Bypass Continuation of International Application No. PCT/KR2022/004755, which was filed on Apr. 4, 2022, and is based on and claims priority under 35 U.S.C. § 119 to Korean Patent Application No. 10-2021-0052268, which was in the Korean Intellectual Property Office filed on Apr. 22, 2021, the entire disclosure of each of which is incorporated herein by reference.

BACKGROUND

1. Field

The disclosure relates generally to an electronic device including a sensor panel.

2. Description of Related Art

Technologies for performing user authentication using biometric information (e.g., a fingerprint, an iris, etc.) obtained by a biosensor have been developed. Fingerprint sensors are generally classified into optical type, ultrasonic type, and capacitive type fingerprint sensors, based on the methods used to obtain fingerprint information.

A fingerprint sensor overlaps at least part of a sensor panel that senses an input of a stylus pen. The sensor panel may include a first sensor panel including an opening area and a second sensor panel that is electrically connected with the first sensor panel and that overlaps the opening area. The fingerprint sensor may overlap the opening area of the first sensor panel.

To increase the recognition rate of a fingerprint sensor, the fingerprint sensor may be formed in a rectangular or large-sized structure. As the fingerprint sensor is made larger, the opening area of the first sensor panel and the second sensor panel may also be made larger.

For electrical connection of the first sensor panel and the second sensor panel, at least some of the plurality of conductive lines disposed on the first sensor panel may be formed in a bypass pattern that bypasses the opening area. The bypass pattern, rather than being a straight-line pattern, may be broken or distorted to cause a problem in the drawing linearity and quality of the sensor panel using the bypass pattern.

When attaching the second sensor panel to the first sensor panel, first, a second surface of the second sensor panel may be attached to the first sensor panel, and second, the remaining second surface of the second sensor panel may be attached to the first sensor panel, Waving may be generated on the surface of the second sensor panel after the first attachment process, and therefore, it may be difficult to secure the alignment and flatness of the second sensor panel during the second attachment process. Accordingly, misalignment of the second sensor panel may occur and the second sensor panel may be distorted after being attached.

SUMMARY

An aspect of the disclosure is to provide an electronic device for securing drawing performance of a sensor panel overlapping a fingerprint sensor and securing degrees of design freedom of the fingerprint sensor and a sensor panel.

Another aspect of the disclosure is to provide a sensor panel to which a large-sized or rectangular front fingerprint sensor is applied, which includes a plurality of first conductive lines and a plurality of second conductive lines formed in a straight-line form around the opening area, thereby securing drawing linearity and a quality of the sensor panel.

Another aspect of the disclosure is to provide a method and apparatus with which deviation information formed by a tilt angle of a second sensor panel may be automatically reflected in firmware, such that drawing performance in various user environments may be secured even without excessive correction.

In accordance with an aspect of the disclosure, an electronic device is provided, which includes a housing, a display, and a sensor panel that is disposed between the display and the housing and that senses input information of a stylus pen. The sensor panel includes a first sensor panel including an opening area and a second sensor panel disposed to cover at least part of the opening area and electrically connected with the first sensor panel. The second sensor panel includes a first circuit board including a first sub-board and a second sub-board, at least part of the first sub-board and at least part of the second sub-board being spaced apart from each other to form a receiving space and a second circuit board, at least part of which being accommodated in the receiving space and surrounded by the first circuit board.

In accordance with another aspect of the disclosure, an electronic device is provided, which includes a housing, a display, a sensor panel that is disposed between the display and the housing and that senses input information of a stylus pen, and a fingerprint sensor disposed between the sensor panel and the display. The sensor panel includes a first sensor panel including an opening area and a second sensor panel that overlaps the fingerprint sensor and that is disposed to cover at least part of the opening area and electrically connected with the first sensor panel. The second sensor panel includes a first circuit board including a first sub-board and a second sub-board, at least part of the first sub-board and at least part of the second sub-board being spaced apart from each other to form a receiving space and a second circuit board, at least part of which being accommodated in the receiving space and surrounded by the first circuit board. A volume of the second circuit board in the receiving space is smaller than the receiving space.

BRIEF DESCRIPTION OF THE DRAWINGS

The above and other aspects, features, and advantages of various embodiments will be more apparent from the following description taken in conjunction with the accompanying drawings, in which.

DETAILED DESCRIPTION

Figure 1:
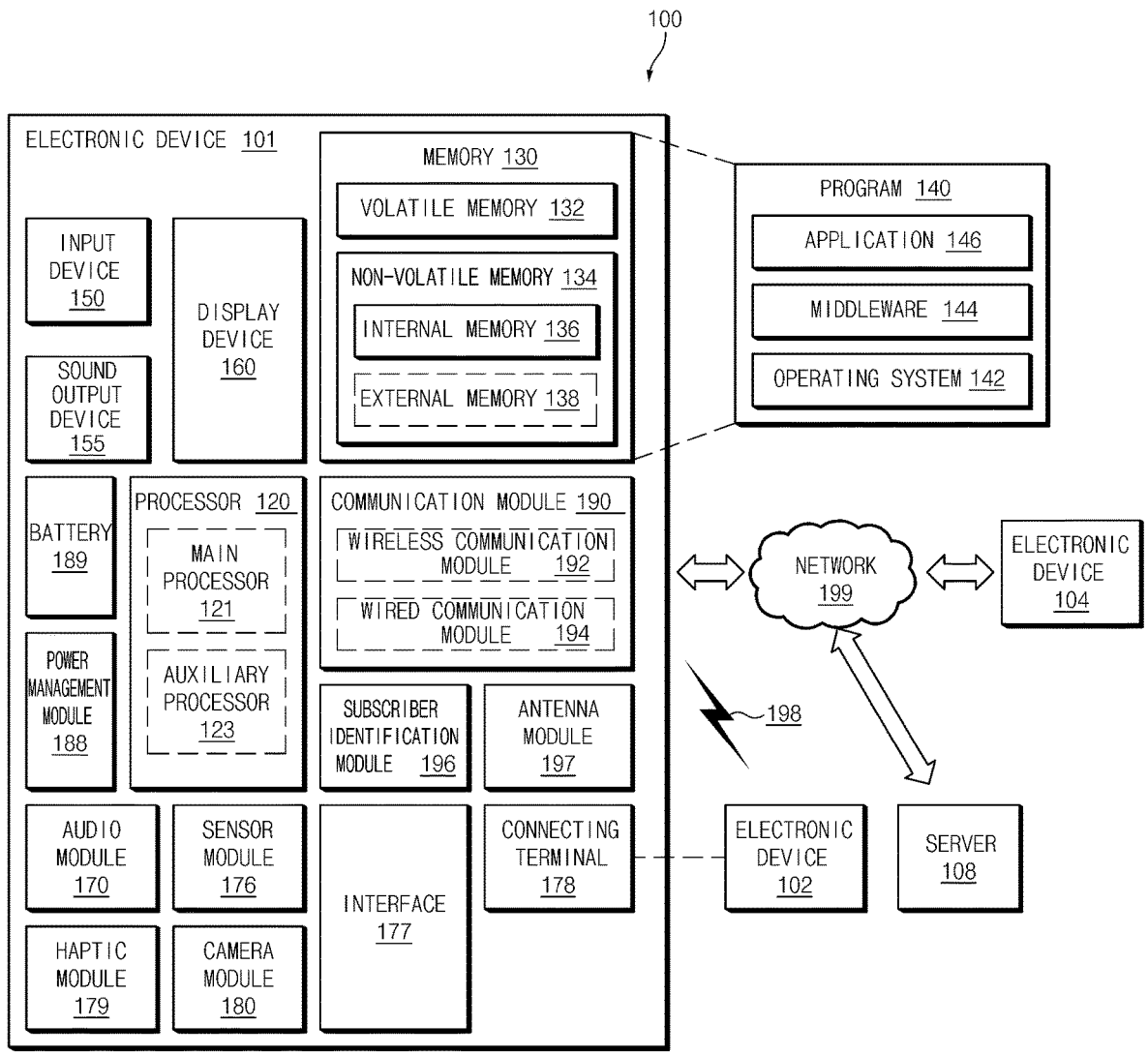
FIG. 1 illustrates an electronic device in a network environment according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

With regard to description of the drawings, identical or similar reference numerals may be used to refer to identical or similar components.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component the camera module 180 or the communication module 190) functionally related to the auxiliary processor 123.

The memory 130 may store various data used by at least one component the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module), A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. The electronic device 101 may provide ultra low-latency services using, e.g., distributed computing or mobile edge computing. In another embodiment, the external electronic device #04 may include an Internet-of-things (IoT) device. The server 108 may be an intelligent server using machine learning and/or a neural network. According to an embodiment, the external electronic device #04 or the server 108 may be included in the second network 199. The electronic device #01 may be applied to intelligent services (e.g., smart home, smart city, smart car, or healthcare) based on 5th generation (5G) communication technology or IoT-related technology.

An electronic device according to various embodiments disclosed in the disclosure may include devices of various forms. The electronic devices, for example, may include a portable communication device (e.g., a smart phone), a computer device, a portable multimedia device, a portable medical device, a camera, a wearable device, or a home appliance. An electronic device according to various embodiments of the disclosure is not limited to the above-mentioned devices.

Figure 2:
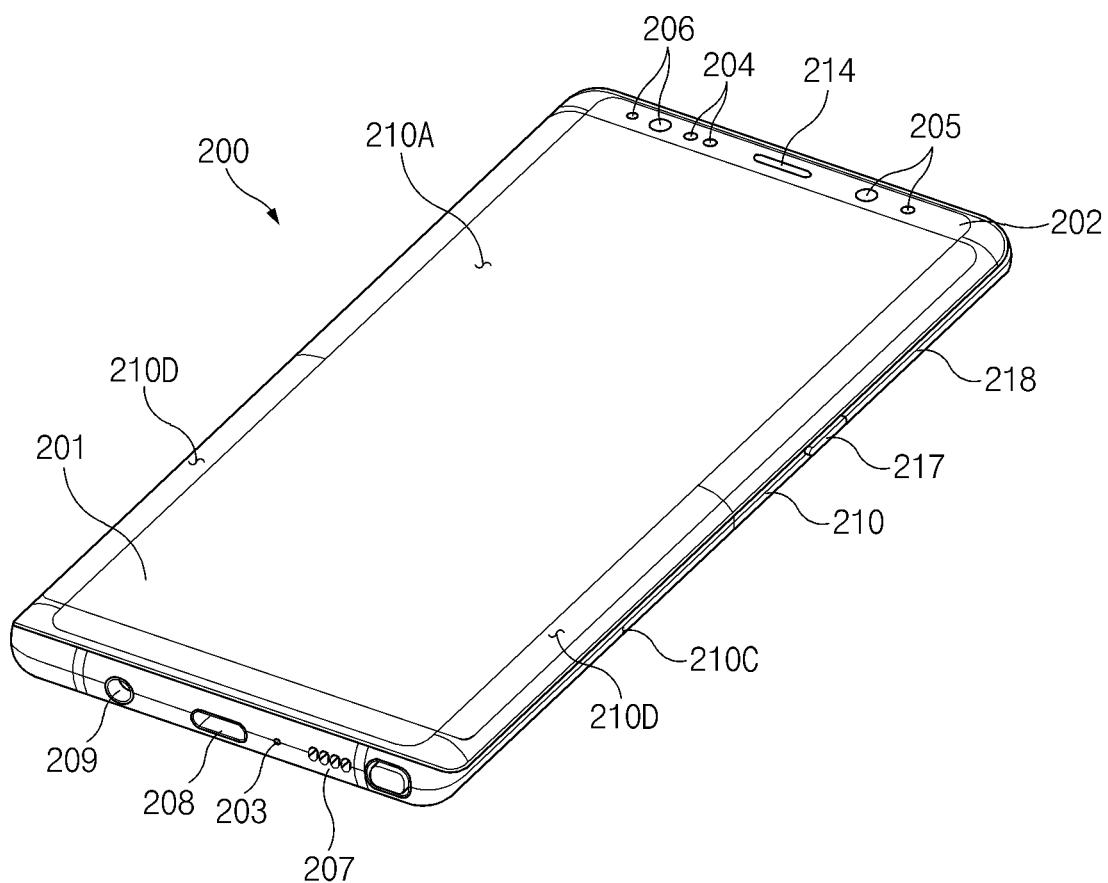
FIG. 2 illustrates a front side of an electronic device according to an embodiment.
Figure 3:
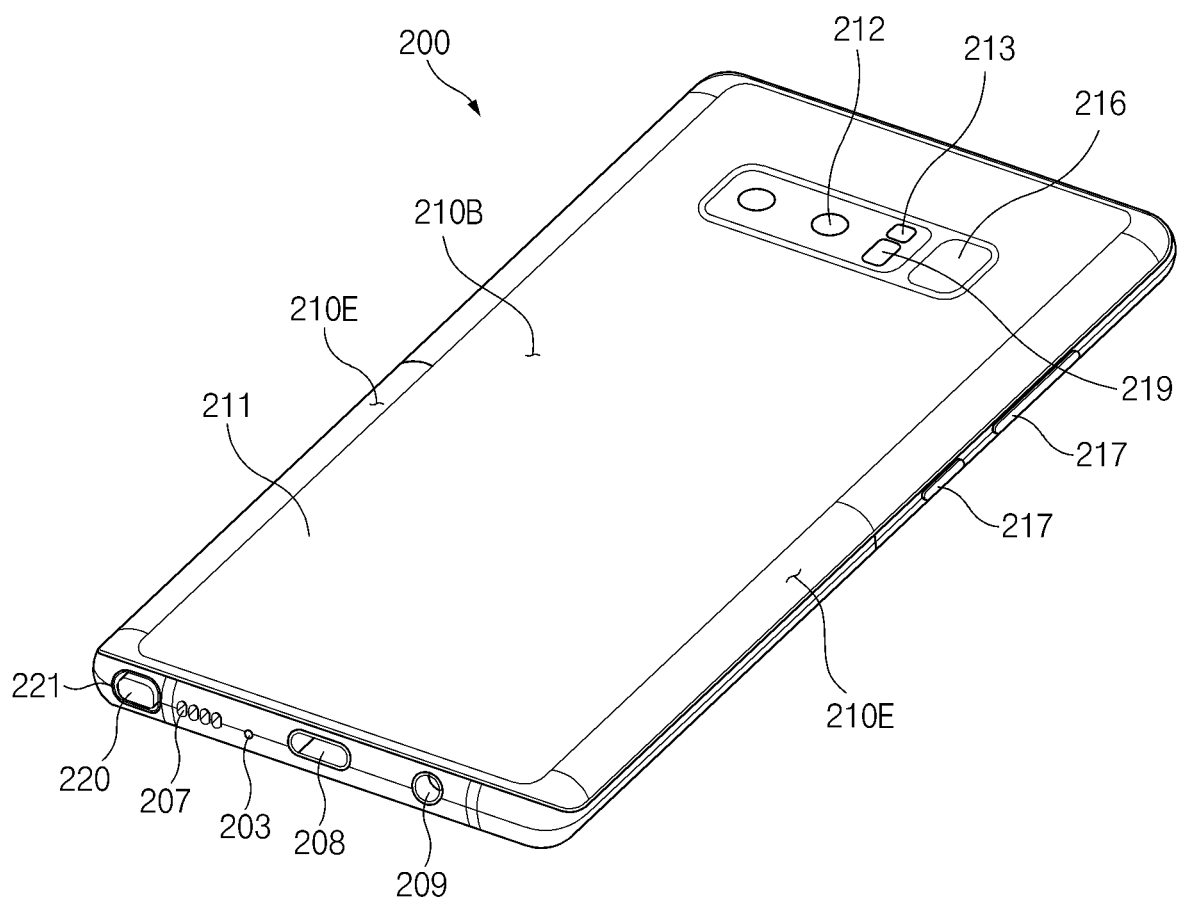
FIG. 3 illustrates a rear side of an electronic device according to an embodiment.

FIG. 2 illustrates a front side an electronic device according to an embodiment. FIG. 3 illustrates a rear side of an electronic device according to an embodiment.

Referring to FIGS. 2 and 3, an electronic device 200 includes a housing 210 that includes a first surface (or a front surface) 210A, a second surface (or a rear surface) 210B, and side surfaces 1100 surrounding a space between the first surface 210A and the second surface 210B. Alternatively, a housing may include a structure that forms some of the first surface 210A, the second surface 210B, and the side surfaces 210C of FIG. 2.

The first surface 210A is formed by a front plate 202, at least part of which is substantially transparent (e.g., a glass plate including various coating layers, or a polymer plate). The second surface 210B is formed by a substantially opaque back plate 211. The back plate 211 may be formed of coated or colored glass, ceramic, polymer, metal (e.g., aluminum, stainless steel (STS), or magnesium), or a combination of at least two of the aforementioned materials. The side surfaces 2100 may be formed by a side bezel structure (or, a "side member") 218 that is coupled with the front plate 202 and the back plate 211 and that contains metal and/or polymer. Alternatively, the back plate 211 and the side bezel structure 218 may be integrally formed with each other and may contain the same material (e.g., a metallic material such as aluminum).

The front plate 202 includes, at opposite long edges thereof, two first areas 210D that curvedly and seamlessly extend from the first surface 210A toward the back plate 211. The back plate 211 includes, at opposite long edges thereof, two second areas 210E that curvedly and seamlessly extend from the second surface 210B toward the front plate 202. Alternatively, the front plate 202 (or the back plate 211) may include only one of the first areas 210D (or the second areas 210E).

As yet another alternative, a part of the first areas 210D or the second areas 210E may not be included.

When viewed from a side of the electronic device 200, the side bezel structure 218 may have a first thickness (or width) at sides not including the first areas 210D or the second areas 210E and may have a second thickness at sides including the first areas 210D or the second areas 210E, the second thickness being smaller than the first thickness. At least one antenna radiator (e.g., a conductive pattern) may be disposed on the side member (e.g., the side bezel structure 218) of the housing 210 of the electronic device 200, the two first areas 210D curvedly and seamlessly extending from the first surface 210A of the front plate 202 toward the back plate 211, or the two second areas 210E curvedly and seamlessly extending from the second surface 210B of the back plate 211 toward the front plate 202.

Alternatively, the first areas 210D or the second areas 210E may be formed to be flat without being curved so as to form substantially one flat surface with the first surface 210A or the second surface 210B.

The at least one antenna radiator may radiate a signal in a specified frequency band. The at least one antenna radiator may be an auxiliary radiator. For example, the at least one antenna radiator may radiate a signal belonging to a frequency band of about 700 MHz to about 3 GHz that is used in a legacy network. As another example, the at least one antenna radiator may radiate a signal belonging to a 5G Sub-6 frequency band of about 3.5 GHz to about 6 GHz, such as n41, n78, and/or n79.

The at least one antenna radiator may radiate a signal belonging to a 5G Above-6 frequency band of about 6 GHz to about 60 GHz, or the at least one antenna radiator may radiate a frequency signal in a. Wi-Fi frequency band and/or a Bluetooth™ frequency band. For example, the frequency band may include a frequency band such as 802.11a, 802.11b, 802.11g, 802.11n, and/or 802.11ac.

The at least one antenna radiator may be a main radiator. The frequency band in which the main radiator radiates a signal and the frequency band in which the auxiliary radiator radiates a signal may partially overlap each other.

The at least one antenna radiator may radiate a frequency signal in a mmWave frequency band. For example, the mmWave frequency band may include a frequency band of about 24 GHz to about 34 GHz and/or about 37 GHz to about 44 GHz, such as n257, n258, n260, and/or n261. The at least one antenna radiator may radiate a frequency signal in an 802.11ay frequency band.

The electronic device 200 includes a display 201, audio modules 203, 207, and 214, sensor modules 204, 216, and 219, camera modules 205 and 212, key input devices 217, a light emitting element 206, and connector holes 208 and 209. Alternatively, at least one of the above-described component (e.g., the key input devices 217 or the light emitting element 206) may be omitted from the electronic device 200, and/or additional component(s) may be included in the electronic device 200.

The display 201 may be visually exposed through most of the front plate 202. At least part of the display 201 may be exposed through the front plate 202 that forms the first surface 210A and at least some of the first areas 210D of the side surfaces 210C. The periphery of the display 201 may be formed to be substantially the same as the shape of the adjacent outside edge of the front plate 202. Alternatively, to expand the area by which the display 201 is visually exposed, the gap between the outside edge of the display 201 and the outside edge of the front plate 202 may be formed to be substantially constant.

A recess or opening may be formed in a portion of a screen display area of the display 201, and the electronic device 200 may include at least one of the audio module 214, the sensor module 204, the camera module 205, or the light emitting element 206 that is aligned with the recess or the opening.

The electronic device 200 may include, on the rear surface of the screen display area of the display 201, at least one of the audio module 214, the sensor module 204, the camera module 205, the fingerprint sensor 216, or the light emitting element 206. The display 201 may be coupled with, or disposed adjacent to, touch detection circuitry, a pressure sensor for measuring the intensity (pressure) of a touch, and/or a digitizer for detecting a stylus pen 220 of a magnetic field type. The stylus pen 220 may be guided and inserted into, or detached from, the housing 210 through a receiving hole 221 formed in the housing 210. At least a part of the sensor modules 204, 216, and 219 and/or at least a part of the key input devices 217 may be disposed in the first areas 210D and/or the second areas 210E. Alternatively, a partial area of the screen display area of the display 201 may include a different pixel structure, a different pixel density, and/or a different wiring structure from the other area of the screen display area of the display 201, and the electronic device 200 may include at least one of the audio module 214, the sensor module 204, the camera module 205, or the light emitting element 206 that is disposed in the position aligned with the partial area.

The audio modules 203, 207, and 214 may include the microphone hole 203 and the speaker holes 207 and 214. A microphone for obtaining an external sound may be disposed in the microphone hole 203 or a plurality of microphones may be disposed in the microphone hole 203 to sense the direction of a sound. The speaker holes 207 and 214 may include the external speaker hole 207 and the receiver hole 214 for telephone call. Alternatively, the speaker holes 207 and 214 and the microphone hole 203 may be implemented with a single hole, or a speaker (e.g., a piezoelectric speaker) may be included without the speaker holes 207 and 214.

The sensor modules 204, 216, and 219 may generate an electrical signal or a data value that corresponds to an operational state inside the electronic device 200 or an environmental state external to the electronic device 200. The sensor modules 204, 216, and 219 may include the first sensor module 204 (e.g., a proximity sensor) and/or the second sensor module (e.g., a fingerprint sensor) that is disposed on the first surface 210A of the housing 210, and/or the third sensor module 219 (e.g., a heart rate monitor (HRM) sensor) and/or the fourth sensor module 216 (e.g., a fingerprint sensor) that is disposed on the second surface 210B of the housing 210. The fingerprint sensor may be disposed not only on the first surface 210A of the housing 210 (e.g., the display 201) but also on the second surface 210B. The electronic device 200 may further include another sensor module, e.g., at least one of a gesture sensor, a gyro sensor, an atmospheric pressure sensor, a magnetic sensor, an acceleration sensor, a grip sensor, a color sensor, an IR sensor, a biosensor, a temperature sensor, a humidity sensor, or an illuminance sensor 204.

The camera modules 205 and 212 may include the first camera device 205 disposed on the first surface 210A of the electronic device 200, and the second camera device 212 and/or a flash 213 disposed on the second surface 210B. The modules 205 and 212 may include one or more lenses, an image sensor, and/or an ISP. The flash 213 may include a light emitting diode (LED) or a xenon lamp. Two or more lenses fan IR camera lens, a wide angle lens, and a telephoto lens) and image sensors may be disposed on one surface of the electronic device 200.

The key input devices 217 may be disposed on the side surfaces 210C of the housing 210. Alternatively, the electronic device 200 may not include all or some of the aforementioned key input devices 217, and the key input devices 217 not included may be implemented in a different form, such as a soft key, on the display 201. The key input devices may include the sensor module 216 disposed on the second surface 210B of the housing 210.

The light emitting element 206 may be disposed on the first surface 210A of the housing 210. The light emitting element 206 may provide state information of the electronic device 200 in the form of light or a light source that operates in conjunction with operation of the camera module 205. The light emitting element 206 may include, for example, an LED, an IR LED, and/or a xenon lamp.

The connector holes 208 and 209 may include a first connector hole 208 capable of accommodating a connector (e.g., a USB connector) for transmitting and receiving electric power and/or data with an external electronic device, and/or a second connector hole 209 (e.g., an earphone jack) capable of accommodating a connector for transmitting and receiving audio signals with an external electronic device.

Figure 4:
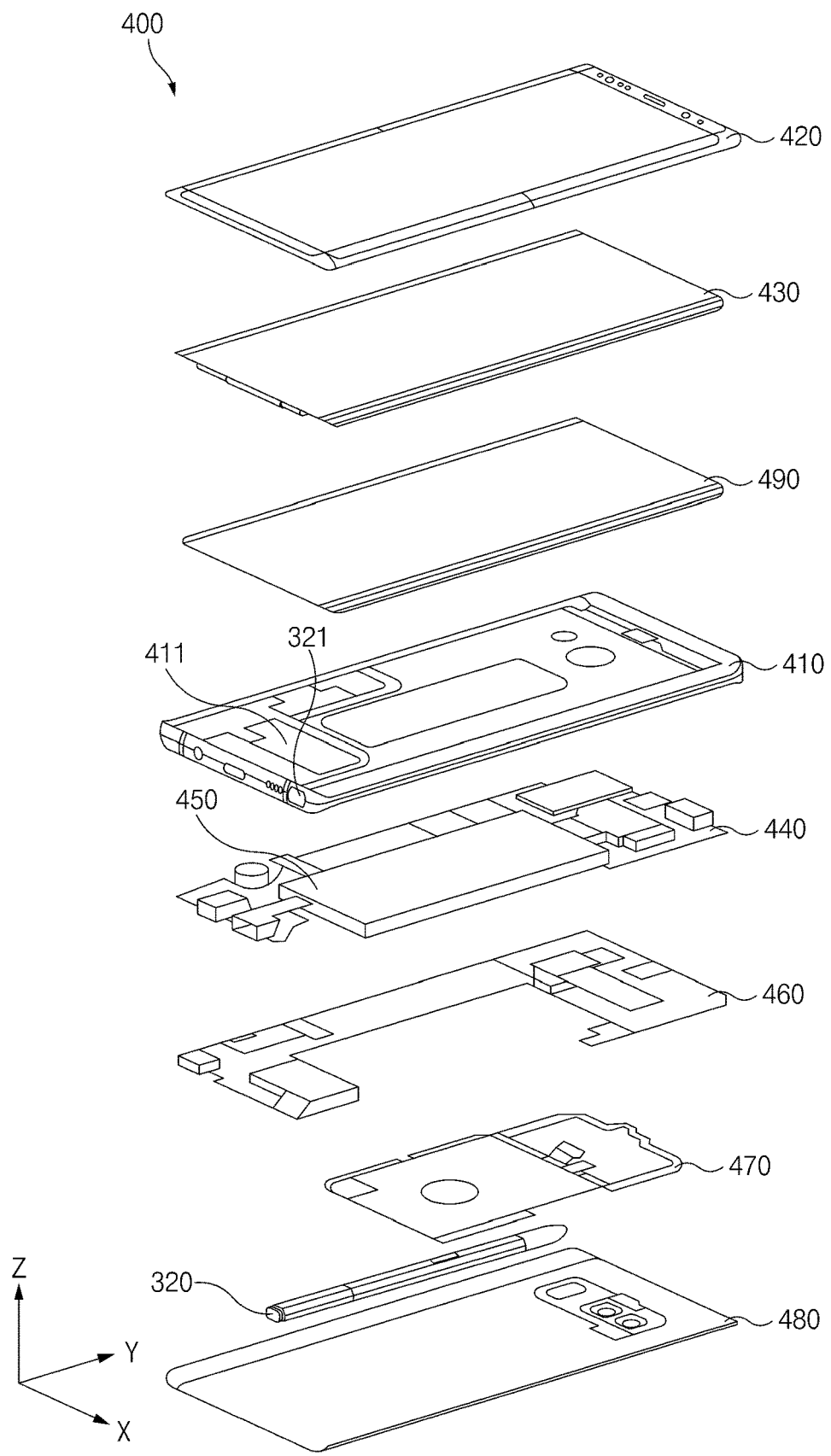
FIG. 4 illustrates an exploded perspective view of an electronic device according to an embodiment.

FIG. 4 illustrates an exploded view of an electronic device according to an embodiment.

Referring to FIG. 4, an electronic device 400 includes a side bezel structure 410, a first support member 411 (e.g., a bracket or a front case), a front plate 420, a display 430, a sensor panel 490, a PCB 440 (e.g., a PCB, a printed board assembly (PBA), a flexible PCB (FPCB), or a rigid-FPCB (RFPCB)), a battery 450, a second support member 460 (e.g., a rear case), an antenna 470, a stylus pen 320, and a back plate 480. Alternatively, at least one component (e.g., the first support member 111 or the second support member 460) may be omitted from the electronic device 400, or additional component(s) may be included in the electronic device 400.

The side bezel structure 110 may surround a space between the front plate 120 and the back plate 480 of the electronic device 400 and may include one or more conductive members separated by a cut-off portion. For example, the side bezel structure 410 may include a plurality of conductive members separated by at least one cut-off portion. The electronic device 400 may include a structure protruding toward the inside of a housing from one end and/or one point of at least one of the plurality of conductive members. The electronic device 400 may include at least one connecting portion that protrudes toward the inside of the housing from one end and/or one point of at least one of the plurality of conductive members and that is physically connected with a support member (e.g., the first support member 411). The electronic device 400 may include a protruding portion that protrudes toward the inside of the housing from one end of at least one of the plurality of conductive members and that is electrically connected with at least one of the plurality of conductive members.

The first support member 411 may be disposed in the space between the front plate 420 and the back plate 480. The first support member 411 may be disposed inside the electronic device 400 and may be connected with the side bezel structure 410, or may be integrally formed with the side bezel structure 410. The first support member 411 may be formed of a metallic material and/or a non-metallic (e.g., a polymer) material. The display 430 may be disposed on a first surface (e.g., one surface facing the +Z-axis direction) of the first support member 411, and the PCB 440 may be disposed on a second surface (e.g., one surface facing the −Z-axis direction) that faces away from the first surface.

A processor, a memory, an interface, an antenna, module, and/or a wireless communication circuit may be disposed on the PCB 440. The processor may include, for example, one or more of a CPU, an AP, a graphic processing unit (GPU), an ISP, a sensor hub processor (SHP), or a CP. The memory may include, for example, a volatile memory or a nonvolatile memory. The interface may include, for example, an HDMI, a USB interface, an SD card interface, and/or an audio interface. For example, the interface may electrically or physically connect the electronic device 400 with an external electronic device and may include a USB connector, an SD card/MMC connector, or an audio connector. The wireless communication circuit may be an RFIC. For example, the wireless communication circuit may feed an electrical signal to a protruding portion formed on at least part of the housing.

The battery 450 may supply electric power to at least one component of the electronic device 400. The battery 450 may include a primary cell that is not rechargeable, a secondary cell that is rechargeable, and/or a fuel cell. For example, at least part of the battery 450 may be disposed substantially side by side with the PCB 440. The battery 450 may be integrally disposed inside the electronic device 400, or may be disposed so as to be detachable from the electronic device 400.

The antenna 470 may be disposed between the back plate 480 and the battery 450. The antenna 470 may include a near field communication (NFC) antenna, a wireless charging antenna, and/or a magnetic secure transmission (MST) antenna. For example, the antenna 470 may perform short-range communication with an external device, or may wirelessly transmit and receive power required for charging. Alternatively, an antenna structure may be formed by part of the side bezel structure 410 and/or part of the first support member 411, or a combination thereof.

The sensor panel 490 may be disposed under the display 430. The sensor panel 490 may be formed in a position adjacent to the display 430 separately from the display 430, or may be embedded in the display 430. The sensor panel 490 may be a digitizer panel for recognizing the stylus pen 320 inserted into the side bezel structure 410 through a receiving hole 321 that is formed in the side bezel structure 410. For example, the sensor panel 490 may be an electromagnetic resonance (EMR) digitizer panel for sensing an input of the stylus pen 320. The sensor panel 490 may include a PCB (e.g., an FPCB) and a shielding sheet. The shielding sheet may prevent mutual interference by electromagnetic fields generated from components (e.g., the display 430, the PCB 440, and/or the sensor panel 490) included in the electronic device 400. The shielding sheet may block the electro-magnetic fields generated from the components, thereby enabling an input from the stylus pen 320 to be accurately transferred to the sensor panel 490. The sensor panel 490 may include an opening area formed in at least a partial area corresponding to a biosensor mounted in the electronic device 400, and the biosensor may overlap the opening area.

Figure 5A:
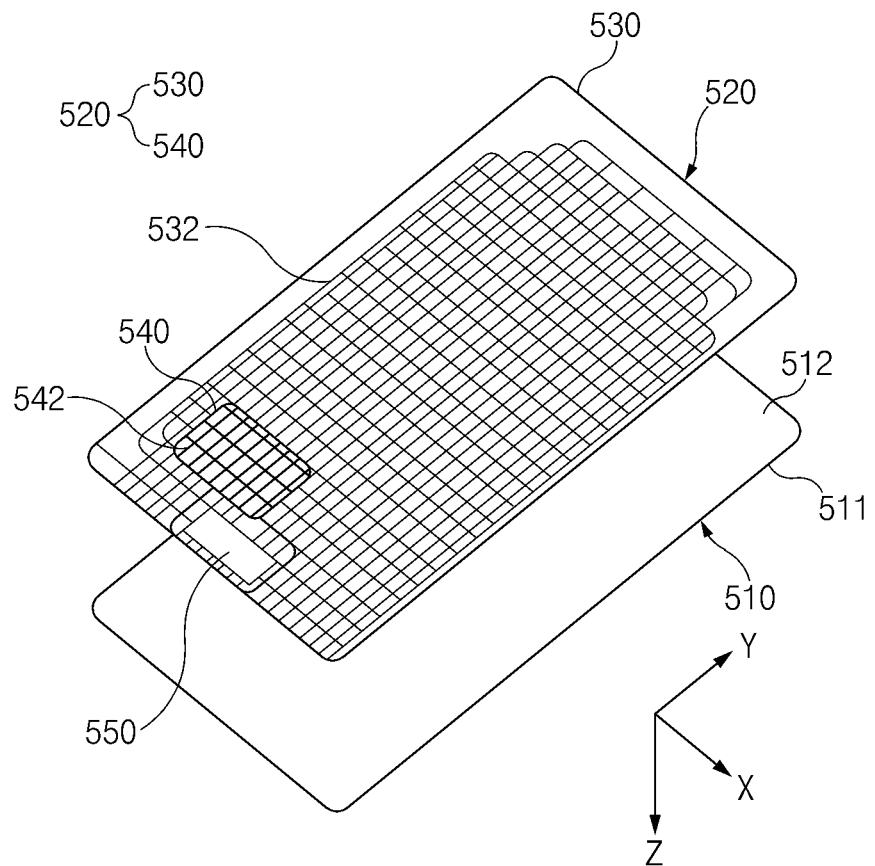
FIGS. 5A and 5B illustrate an electronic device including a sensor panel and a display according to an embodiment.
Figure 5B:
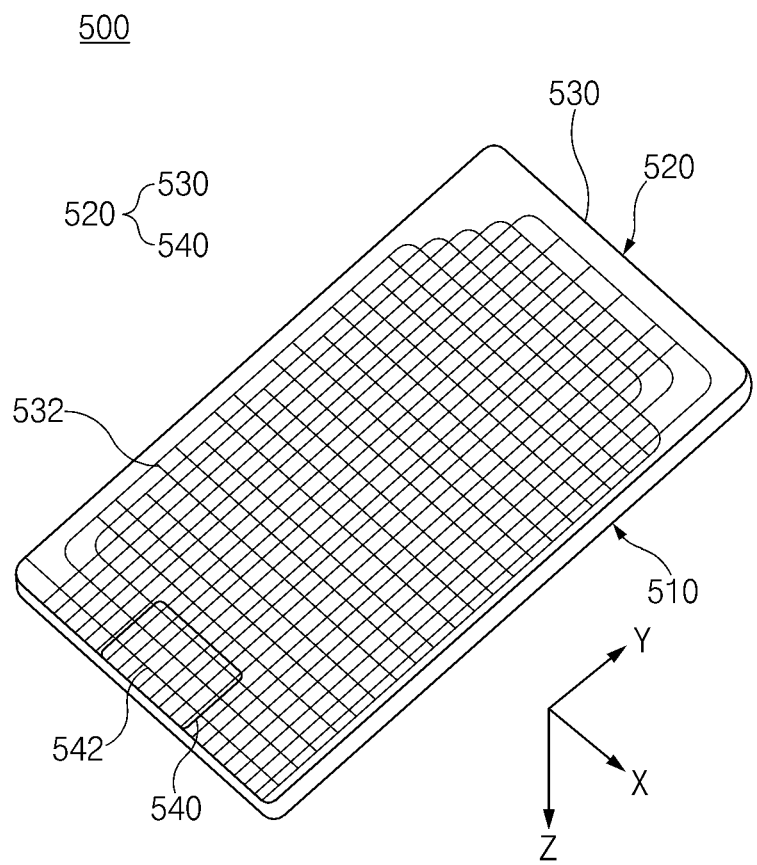

FIGS. 5A and 5B illustrate an arrangement relationship between a display and a sensor panel included in an electronic device according to an embodiment.

Referring to FIGS. 5A and 5B, an electronic device 500 includes a display 510 and a sensor panel 520.

The display 510 includes a first surface 511 facing the front direction (e.g., the +Z-axis direction) and a second surface 512 facing the rear direction (e.g., the −Z-axis direction) opposite to the front direction. The display 510 may include a flexible material that can be folded or a rigid material. The display 510 may be implemented in a flat shape or a curved shape having a curvature, or by a combination thereof.

The sensor panel 520 may be a digitizer panel for recognizing a stylus pen. The sensor panel 520 includes a first sensor panel 530 and a second sensor panel 540.

The first sensor panel 530 may be disposed to face the second surface 512 of the display 510. The first sensor panel 530 may include an opening area 550 formed in at least a partial area corresponding to a biosensor disposed in the electronic device 500. The first sensor panel 530 may be at least one FPCB having a plurality of conductive lines 532 formed thereon.

The second sensor panel 540 may be formed to be larger than the opening area 550 and may be disposed to overlap the opening area 550. The second sensor panel 540 may be a plurality of FPCBs having a plurality of bridge lines 542 formed thereon.

At least part of the second sensor panel 540 may be disposed to overlap at least part of the first sensor panel 530 and may be bonded with the at least part of the first sensor panel 530 by a bonding process. The bonding process may be a conductive bonding process. The conductive bonding process may include a jet soldering process, a soldering process, or an anisotropic conductive film (ACF). As the second sensor panel 540 and the first sensor panel 530 are coupled through the bonding process, the first sensor panel 530 and the second sensor panel 540 may be electrically connected. The plurality of conductive lines 532 of the first sensor panel 530 cannot form a loop coil in the opening area 550, but may be electrically connected through the bridge lines 542 of the second sensor panel 540 to form a loop coil.

Figure 6A:
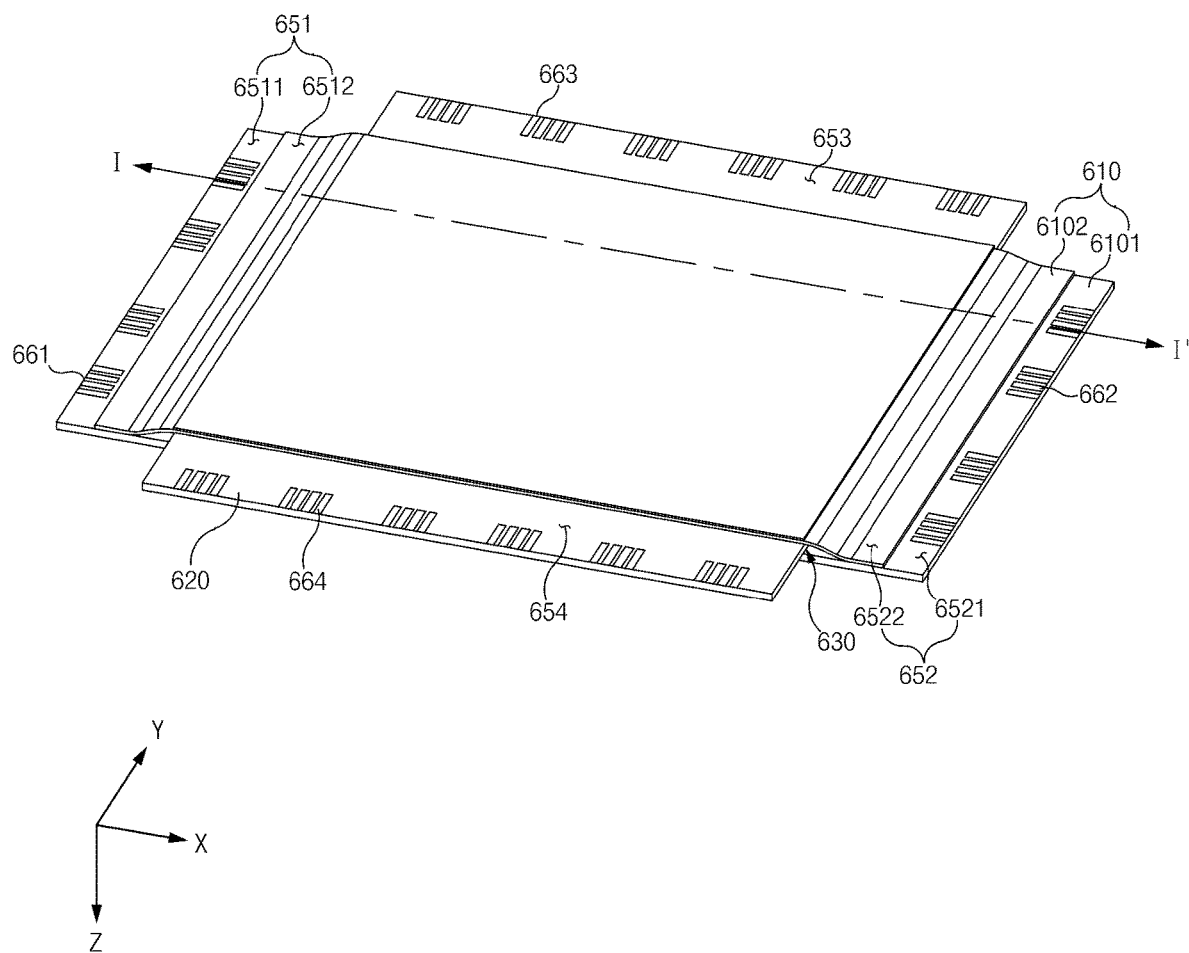
FIG. 6A illustrates a second sensor panel according to an embodiment.
Figure 6B:
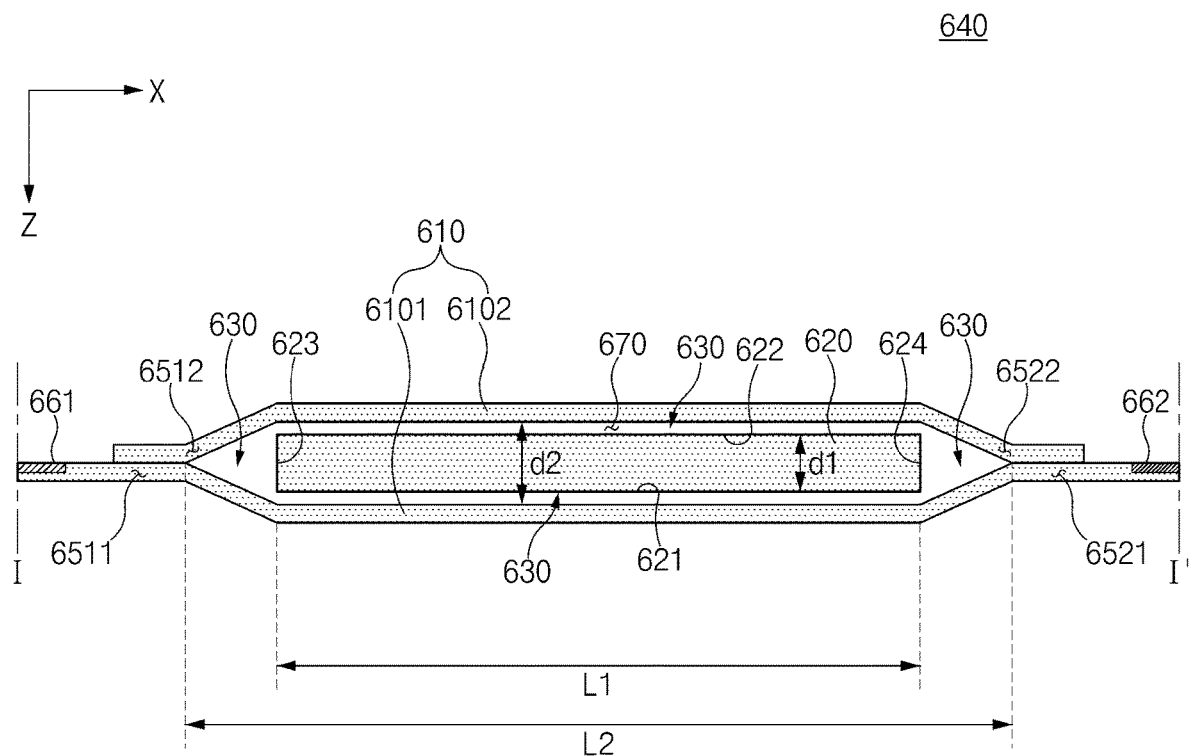
FIG. 6B illustrates a sectional view of the second sensor panel of FIG. 6A taken along line I-I', according to an embodiment.

FIG. 6A illustrates a second sensor panel of a sensor panel according to an embodiment. FIG. 6B illustrates a sectional view of the second sensor panel in FIG. 6A, taken along line I-I', according to an embodiment.

Referring to FIGS. 6A and 6B, a second sensor panel 640 of a sensor panel includes a first circuit board 610 and a second circuit board 620.

The first circuit board 610 includes a first sub-board 6101 and a second sub-board 6102. The first sub-board 6101 may be formed to have a larger area than the second sub-board 6102. For example, the horizontal length of the first sub-board 6101 substantially parallel to a first direction (e.g., the −X-axis direction) or a second direction (e.g., the +X-axis direction) may be longer than the horizontal length of the second sub-board 6102. The second sub-board 6102 may be disposed on areas of the first sub-board 6101 other than first contact pads 661 and second contact pads 662.

A plurality of bridge lines connecting the first contact pads 661 and the second contact pads 662 may be formed on at least one of the first sub-board 6101 or the second sub-board 6102. The plurality of bridge lines may extend along the first direction or the second direction. The plurality of bridge lines extending along the first direction or the second direction may be formed on the first sub-board 6101, or some of the plurality of bridge lines may be formed on the first sub-board 6101, and the other bridge lines may be formed on the second sub-board 6102.

The first sub-board 6101 and the second sub-board 6102 may be coupled such that a receiving space 670 is provided between the first sub-board 6101 and the second sub-board 6102. The second circuit board 620 may be disposed in the receiving space 670 provided by the coupling of the first sub-board 6101 and the second sub-board 6102. The first circuit board 610 may be formed to surround the second circuit board 620.

The first circuit board 610 includes a first extending area 651 extending in the first direction (e.g., the −X-axis direction) further than the second circuit board 620 and a second extending area 652 extending in the second direction (e.g., the +X-axis direction) opposite to the first direction further than the second circuit board 620. The first extending area 651 and the second extending area 652 may not overlap the second circuit board 620.

The first extending area 651 may include a first sub-extending area 6511 of the first sub-board 6101 and a second sub-extending area 6512 of the second sub-board 6102. The second extending area 652 may include a third sub-extending area 6521 of the first sub-board 6101 and a fourth sub-extending area 6522 of the second sub-board 6102.

The first sub-extending area 6511 may extend in the first direction further than the second sub-extending area 6512, and thus, a partial area of the first sub-extending area 6511 may not overlap the second sub-extending area 6512. The plurality of first contact pads 661 may be disposed on the first sub-extending area 6511 that does not overlap the second sub-extending area 6512. The plurality of first contact pads 661 may be electrically and physically connected with a first sensor panel through a bonding process.

A partial area of the second sub-extending area 6512 may be attached to a partial area of the first sub-extending area 6511 along a third direction (e.g., the +Y-axis direction) or a fourth direction (e.g., the −Y-axis direction). An adhesive member formed along the third direction or the fourth direction may be disposed between the partial area of the second sub-extending area 6512 and the partial area of the first sub-extending area 6511.

The remaining area of the second sub-extending area 6512 may be spaced apart from the first sub-extending area 6511. The second sub-extending area 6512 may have a gradually decreasing separation distance from the first sub-extending area 6511 further away from a third surface 623 of the second circuit board 620. At least one of the first sub-extending area 6511 or the second sub-extending area 6512 that surrounds the third surface 623 of the second circuit board 620 may be formed to have an inclined surface. For example, the area of the second sub-extending area 6512 that surrounds the third surface 623 of the second circuit board 620 may be formed to have an inclined surface.

The third sub-extending area 6521 may extend in the second direction further than the fourth sub-extending area 6522, and thus, a partial area of the third sub-extending area 6521 may not overlap the fourth sub-extending area 6522. The plurality of second contact pads 662 may be disposed on the third sub-extending area 6521 that does not overlap the fourth sub-extending area 6522. The plurality of second contact pads 662 may be electrically and physically connected with the first sensor panel through a bonding process. The plurality of second contact pads 662 may be disposed in a row along the third direction substantially perpendicular to the first direction or the second direction.

A partial area of the fourth sub-extending area 6522 may be attached to a partial area of the third sub-extending area 6521 along the third direction (e.g., the +Y-axis direction) or the fourth direction (e.g., the −Y-axis direction). An adhesive member formed along the third direction or the fourth direction may be disposed between the partial area of the fourth sub-extending area 6522 and the partial area of the third sub-extending area 6521, The remaining area of the fourth sub-extending area 6522 may be spaced apart from the third sub-extending area 6521. The fourth sub-extending area 6522 may have a gradually decreasing separation distance from the third sub-extending area 6521 farther away from a fourth surface 624 of the second circuit board 620. At least one of the third sub-extending area 6521 or the fourth sub-extending area 6522 that surrounds the fourth surface 624 of the second circuit board 620 may be formed to have an inclined surface.

The second circuit board 620 includes a first surface 621, a second surface 622, the third surface 623, and the fourth surface 624. The first surface 621 and the second surface 622 may be disposed to face away from each other. The first surface 621 may face the front direction (e.g., the +Z-axis direction) toward the first sub-board 6101, and the second surface 622 may face the rear direction (e.g., the −Z-axis direction) toward the second sub-board 6102. The third surface 623 and the fourth surface 624 may be disposed to face away from each other. The third surface 623 may face the first direction (e.g., the −X-axis direction) toward the first contact pads 661 of the first circuit board 610, and the fourth surface 624 may face the second direction (e.g., the +X-axis direction) toward the second contact pads 662.

The second circuit board 620 may be formed to pass through the receiving space 670 of the first circuit board 610. The horizontal length of the second circuit board 620 substantially parallel to the first direction (e.g., the −X-axis direction) or the second direction (e.g., the +X-axis direction) may be shorter than the horizontal length of the second sub-board 6102, The vertical length of the second circuit board 620 substantially parallel to the third direction (e.g., the +Y-axis direction) or the fourth direction the −Y-axis direction) may be longer than the vertical length of at least one of the first sub-board 6101 or the second sub-board 6102.

The second circuit board 620 includes a third extending area 653 extending in the third direction (e.g., the +Y-axis direction) further than the first circuit board 610 and a fourth extending area 654 extending in the fourth direction (e.g., the −Y-axis direction) further than the first circuit board 610. The third direction may be substantially perpendicular to at least one of the first direction or the second direction, and the fourth direction may be opposite to the third direction.

The third extending area 653 and the fourth extending area 654 may not overlap the first circuit board 610. A plurality of third contact pads 663 may be disposed on the third extending area 653 that does not overlap the first circuit board 610. A plurality of fourth contact pads 664 may be disposed on the fourth extending area 654 that does not overlap the first circuit board 610.

The plurality of third contact pads 663 and the plurality of fourth contact pads 664 may be electrically and physically connected with the first sensor panel through a bonding process. The plurality of third contact pads 663 and the plurality of fourth contact pads 664 may each be disposed in a row along the first direction or the second direction.

A plurality of bridge lines connecting the third contact pads 663 and the fourth contact pads 664 may be formed on the second circuit board 620. The plurality of bridge lines may extend along the third direction or the fourth direction.

The second circuit board 620 may be disposed in the receiving space 670 provided by the coupling of the first sub-board 6101 and the second sub-board 6102. The volume of the second circuit board 620 in the receiving space 670 of the entire volume of the second circuit board 620 may be formed to be smaller than the receiving space 670. The separation distance L2 between contact portions of the first sub-extending area 6511 and the second sub-extending area 6512 that form the receiving space 670 and contact portions of the third sub-extending area 6521 and the fourth sub-extending area 6522 may be formed to be longer than the horizontal length L1 of the second circuit board 620. Further, the separation distance d2 between the first sub-board 6101 and the second sub-board 6102 that form the receiving space 670 may be greater than the thickness d1 of the second circuit board 620.

A plurality of cavity areas 630 may be disposed between the first circuit board 610 and the second circuit board 620. At least one cavity area 630 may be the remaining empty space other than the space occupied by the second circuit board 620 in the receiving space 670. At least one cavity area 630 may be provided between the first sub-board 6101, the second sub-board 6102, and each of the third surface 623 and the fourth surface 624 of the second circuit board 620. At least one cavity area 630 may be provided between the first surface 621 of the second circuit board 620 and the first sub-board 6101 and may be provided between the second surface 622 of the second circuit board 620 and the second sub-board 6102. At least one cavity area 630 may be left as an empty space, and air may be located therein.

The second circuit board 620 may have mobility in the receiving space 670 by at least one cavity area 630. Even though the first circuit board 610 attached to the first sensor panel has a wavy surface, the second circuit board 620 having mobility by the at least one cavity area 630 may be attached to the first sensor panel.

As the second circuit board 620 and the first circuit board 610 are separate components, the position and angle of the second circuit board 620 may be adjustable when the second circuit board 620 is attached to the first sensor panel to which the first circuit board 610 is attached.

The uppermost layer and the lowermost layer of the remaining area of each of the first sub-board 6101 and the second sub-board 6102 other than the first contact pads 661 and the second contact pads 662, may be formed of an insulating material. The uppermost layer and the lowermost layer of the remaining area of the second circuit board 620, other than the third contact pads 663 and the fourth contact pads 664, may be formed of an insulating material. Accordingly, a short circuit between the first circuit board 610 and the second circuit board 620 facing each other with the receiving space 670 therebetween may be prevented.

The first circuit board 610 may first be attached to the first sensor panel through a soldering process, and second, the second circuit board 620 may be attached through a soldering process. Alternatively, the second circuit board 620 may first be attached to the first sensor panel through a soldering process, and second, the first circuit board 610 may be attached through a soldering process.

The second sensor panel 640 may be provided by forming the receiving space 670 by attachment of the second sub-board 6102 to the first sub-board 6101 and inserting the second circuit board 620 into the receiving space 670. Alternatively, the second sensor panel 640 may be provided by aligning the second circuit board 620 over the first sub-board 6101 and then attaching the second sub-board 6102 to the first sub-board 6101.

Although FIGS. 6A and 6B illustrate a structure in which the first circuit board 610 includes the first sub-board 6101 and the second sub-board 6102 to accommodate the second circuit board 620, without being limited thereto, various modifications can be made. For example, the second circuit board 620 may include a first sub-board 6101 and a second sub-board 6102 to provide a receiving space. The first circuit board 610 may be disposed to pass through the receiving space of the second circuit board 620.

Figure 7:
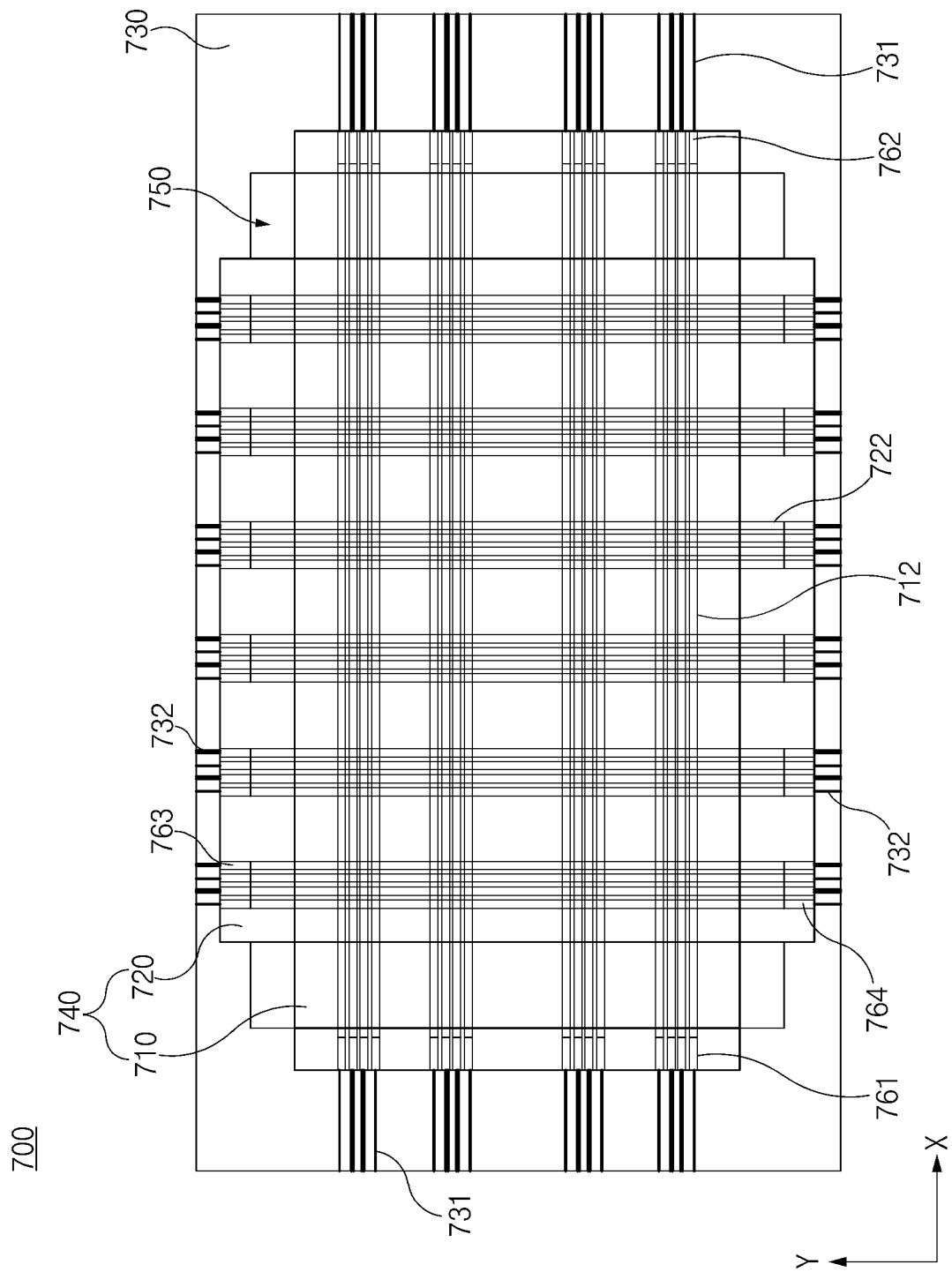
FIG. 7 illustrates an arrangement relationship of conductive lines and bridge lines of a sensor panel according to an embodiment.

FIG. 7 illustrates an arrangement relationship of conductive lines and bridge lines of a sensor panel according to an embodiment. Specifically, FIG. 7 illustrates a sensor panel 700 in which a first sensor panel 730 and a second sensor panel 740 are coupled.

Referring to FIG. 7, the first sensor panel 730 includes an opening area 750 and a plurality of conductive lines. The plurality of conductive lines include a plurality of first conductive lines 731 and a plurality of second conductive lines 732.

The plurality of first conductive lines 731 may be formed in the form of a straight line along the first direction (e.g., the −X-axis direction) or the second direction (e.g., the +X-axis direction). Each of the plurality of first conductive lines 731 cannot form a loop coil in the area corresponding to the opening area 750. However, in the opening area 750, the second sensor panel 740 may be coupled with the first sensor panel 730 so that a loop coil may be formed.

The plurality of second conductive lines 732 may be formed in the form of a straight line along the third direction (e.g., the +Y-axis direction) or the fourth direction (e.g., the −Y-axis direction). Each of the plurality of second conductive lines 732 cannot form a loop coil in the area corresponding to the opening area 750. However, in the opening area 750, the second sensor panel 740 may be coupled with the first sensor panel 730 so that a loop coil may be formed.

The second sensor panel 740 includes a first circuit board 710 and a second circuit board 720 crossing each other. The first circuit board 710 includes a plurality of first bridge lines 712. The plurality of first bridge lines 712 may be electrically connected with the plurality of first conductive lines 731 disposed on the left side (e.g., the side that the −X-axis faces) with respect to the opening area 750 through first contact pads 761 respectively. The plurality of first bridge lines 712 may be electrically connected with the plurality of first conductive lines 731 disposed on the right side (e.g., the side that the +X-axis faces) with respect to the opening area 750 through second contact pads 762, respectively.

The second circuit board 720 includes a plurality of second bridge lines 722. The plurality of second bridge lines 722 may be electrically connected with the plurality of second conductive lines 732 disposed on the upper side (e.g., the side that the +Y-axis faces) with respect to the opening area 750 through third contact pads 763, respectively. The plurality of second bridge lines 722 may be electrically connected with the plurality of second conductive lines 732 disposed on the lower side (e.g., the side that the −Y-axis faces) with respect to the opening area 750 through fourth contact pads 764, respectively.

Alternatively, at least one of the plurality of first conductive lines 731, the plurality of second conductive lines 732, the plurality of first bridge lines 712, or the plurality of second bridge lines 722 may be formed in the form of a straight line having linearity. At least one of the plurality of first conductive lines 731, the plurality of second conductive lines 732, the plurality of first bridge lines 712, or the plurality of second bridge lines 722 may be formed in a straight-line form rather than a bent form in the vicinity of the opening area 750. Accordingly, at least one of the plurality of first conductive lines 731, the plurality of second conductive lines 732, the plurality of first bridge lines 712, or the plurality of second bridge lines 722 may secure a degree of design freedom. Thus, drawing performance may be secured, and a degree of freedom in design of a fingerprint sensor may be secured.

Figure 8A:
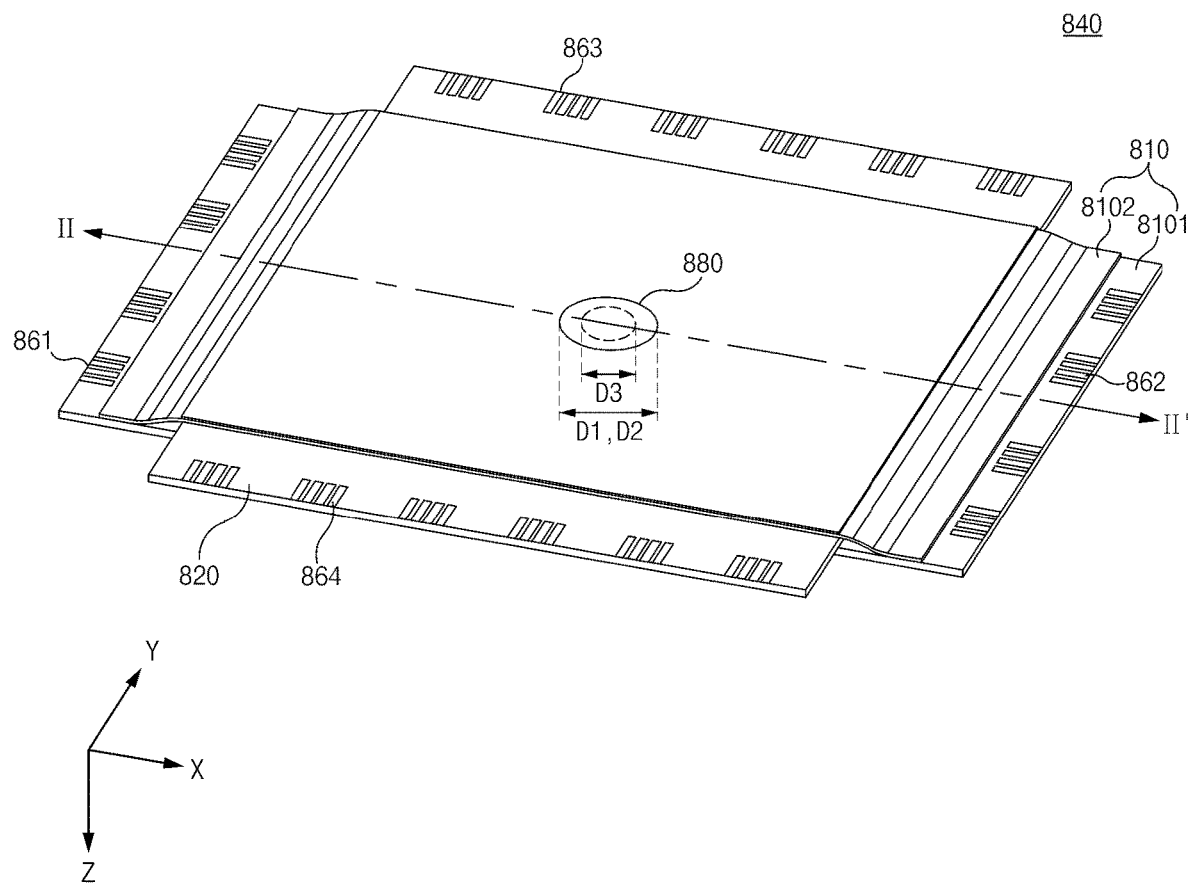
FIG. 8A illustrates a second sensor panel including a fixing holder member according to an embodiments.
Figure 8B:
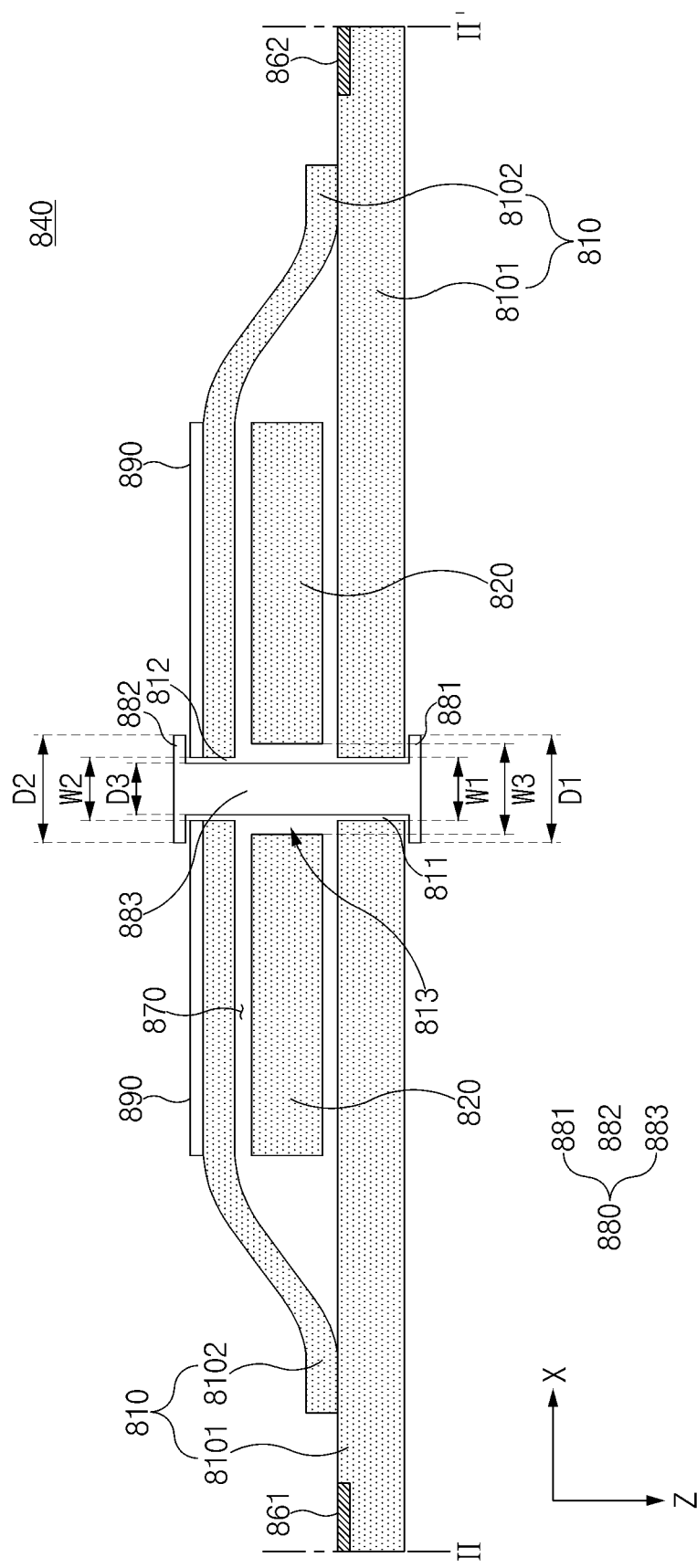
FIG. 8B illustrates a sectional view of the second sensor panel in FIG. 8A taken along line II-II' according to an embodiment.

FIG. 8A illustrates a second sensor panel including a fixing holder according to an embodiment. FIG. 8B is a sectional view of the second sensor panel in FIG. 8A, taken along line II-II', according to an embodiment.

Referring to FIGS. 8A and 8B, a second sensor panel 840 includes a first circuit board 810, a second circuit board 820, and a fixing holder member 880.

The first circuit board 810 includes a first sub-board 8101 and a second sub-board 8102 that form a receiving space 870. A plurality of first contact pads 861 and a plurality of second contact pads 862 may be disposed on the first sub-board 8101. A plurality of first bridge lines electrically connected with the first contact pads 861 and the second contact pads 862 may be disposed on at least one of the first sub-board 8101 or the second sub-board 8102. The plurality of first bridge lines may be disposed to bypass first to third through-holes 811, 812, and 813 in the area corresponding to the fixing holder member 880.

At least one thin-film function member 890 may be disposed on the second sub-board 8102. Various thin-film function members 890 may be disposed between the second sub-board 8102 and a housing within an allowable thickness. For example, the thin-film function member 890 may be at least one of a shielding member or a heat radiating member. The shielding member may prevent mutual interference by electro-magnetic fields generated from components (included in an electronic device. The shielding member may block the electro-magnetic fields generated from the components included in the electronic device, thereby preventing deterioration in the performance of the sensor panel. The shielding member may be formed of magnetic metal powder (MMP) and/or copper (Cu).

The heat radiating member may transfer heat generated from the components included in the electronic device to a relatively low-temperature area.

According to an embodiment, separate wiring may not be disposed on the second sub-board 8102. Instead, the second sub-board 8102 may be formed of only the thin-film function member 890, and thus, the thickness of the second sub-board 8102 may be decreased.

The first sub-board 8101 may include the first through-hole 811 formed through the first sub-board 8101. The second sub-board 8102 may include the second through-hole 812 formed in the position corresponding to the first through-hole 811. The second through-hole 812 may be formed through the second sub-board 8102. The diameter w2 of the second through-hole 812 may be the same as or different from the diameter w1 of the first through-hole 811. The diameter of the second through-hole 812 may be equal to the diameter w1 of the first through-hole 811 and may be smaller than the diameter w3 of the third through-hole 813.

A plurality of third contact pads 863 and a plurality of fourth contact pads 864 may be disposed on the second circuit board 820. A plurality of second bridge lines electrically connected with the third contact pads 863 and the fourth contact pads 864 may be disposed on the second circuit board 820. The plurality of second bridge lines may be disposed to bypass the first to third through-holes 811, 812, and 813 in the area corresponding to the fixing holder member 880.

The second circuit board 820 may be inserted into the receiving space 870 and may include the third through-hole 813 formed in the position corresponding to the first through-hole 811 and the second through-hole 812. The third through-hole 813 may be formed through the second circuit board 820. The diameter w3 of the third through-hole 813 may be greater than at least one of the diameter w1 of the first through-hole 811 or the diameter w2 of the second through-hole 812. The second circuit board 820 may move in the remaining space other than the space occupied by the fixing holder member 880 in the third through-hole 813, and thus, adjustment of the position and angle of the second circuit board 820 may not be obstructed by the fixing holder member 880.

The fixing holder member 880 may be formed of a non-conductive material, e.g., a rubber material. The fixing holder member 880 may minimize a movement of the second circuit board 820 in the third direction (e.g., the +Y-axis direction) or the fourth direction (e.g., the −Y-axis direction), The fixing holder member 880 may prevent separation of the second circuit board 820 from the receiving space 870 of the first circuit board 810 in a process of transportation or while a process is performed. The fixing holder member 880 may include a first holder area 881, a second holder area 882, and a third holder area 883.

The first holder area 881 may protrude from the third holder area 883 in the front direction (e.g., the +Z-axis direction). The first holder area 881 may be formed to cover a partial area of the first sub-board 8101. The diameter D1 of the first holder area 881 may be greater than the diameter D3 of the third holder area 883, and thus the first holder area 881 may prevent the third holder area 883 from being separated in the rear direction (e.g., the −Z-axis direction) from the first to third through-holes 811, 812, and 813.

The second holder area 882 may protrude from the third holder area 883 to face away from the first holder area 881. The second holder area 882 may protrude from the third holder area 883 in the rear direction (e.g., the −Z-axis direction). The second holder area 882 may be formed to cover a partial area of the thin-film function member 890. The diameter D2 of the second holder area 882 may be greater than the diameter D3 of the third holder area 883, and thus the second holder area 882 may prevent the third holder area 883 from being separated in the front direction (e.g., the +Z-axis direction) from the first to third through-holes 811, 812, and 813.

The third holder area 883 may be disposed between the first holder area 881 and the second holder area 882. The first holder area 881 and the second holder area 882 may protrude from the third holder area 883 in the opposite directions. The diameter D3 of the third holder area 883 may be formed to be smaller than the diameters w2, and w3 of the first to third through-holes 811, 812, and 813, and thus the third holder area 883 may be inserted into the first to third through-holes 811, 812, and 813.

A central portion of the second circuit board 820 or a central portion of a biosensor disposed between the second circuit board 820 and a display may make the greatest movement in the front direction (e.g., the +Z-axis direction) or the rear direction (e.g., the −Z-axis direction) when the electronic device is dropped. Accordingly, the first to third through-holes (or punching holes) 811, 812, and 813 may be formed in the areas corresponding to the central portion of the second circuit board 820 or the central portion of the biosensor, and the fixing holder member 880 made of a rubber material may be disposed to pass through the first to third through-holes 811, 812, and 813. The second circuit board 820 may be fixed by the fixing holder member 880 without being separated from the receiving space 870 of the first circuit board 810.

Figure 9A:
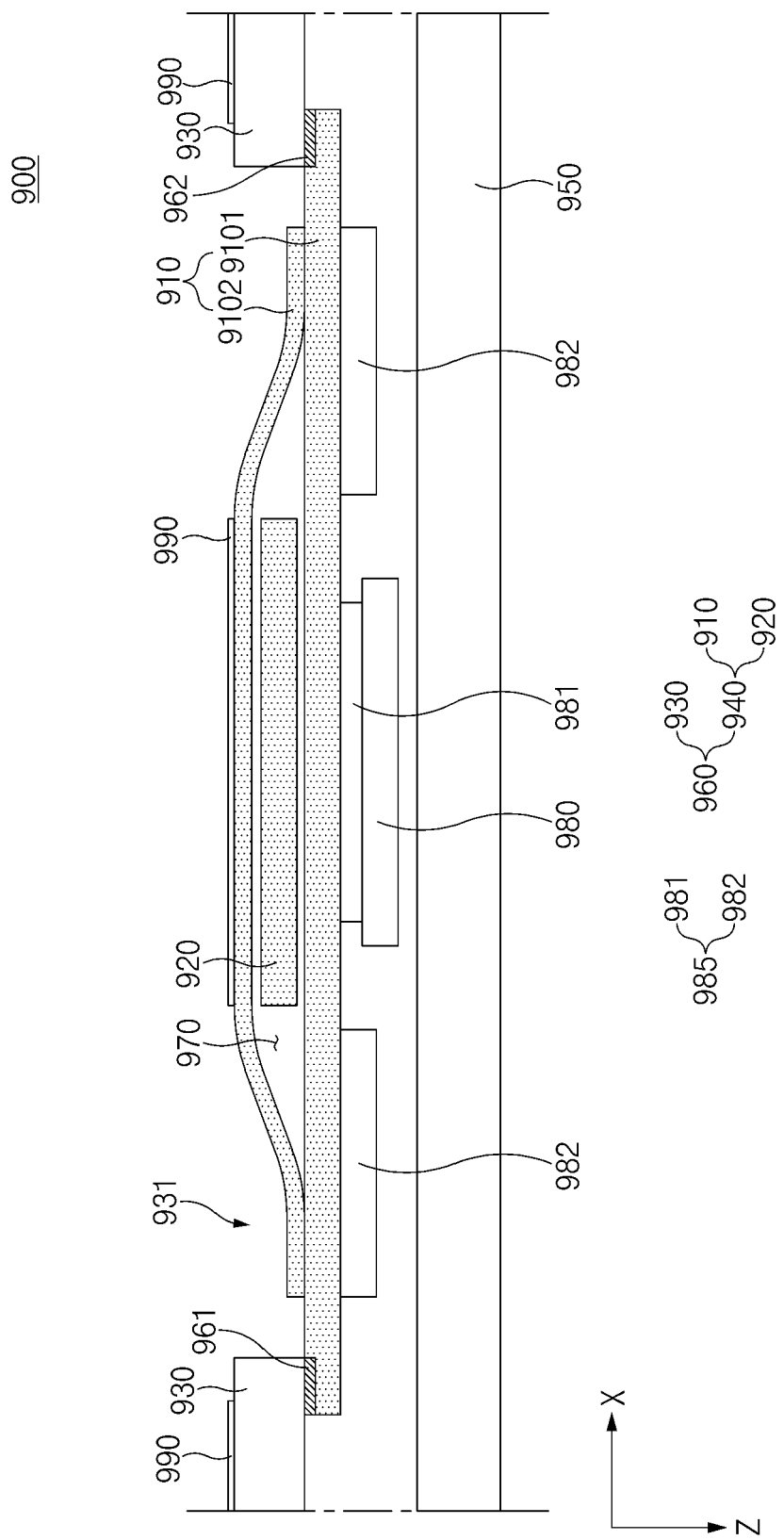
FIG. 9A illustrates a sensor panel including a contact prevention member according to an embodiment.
Figure 9B:
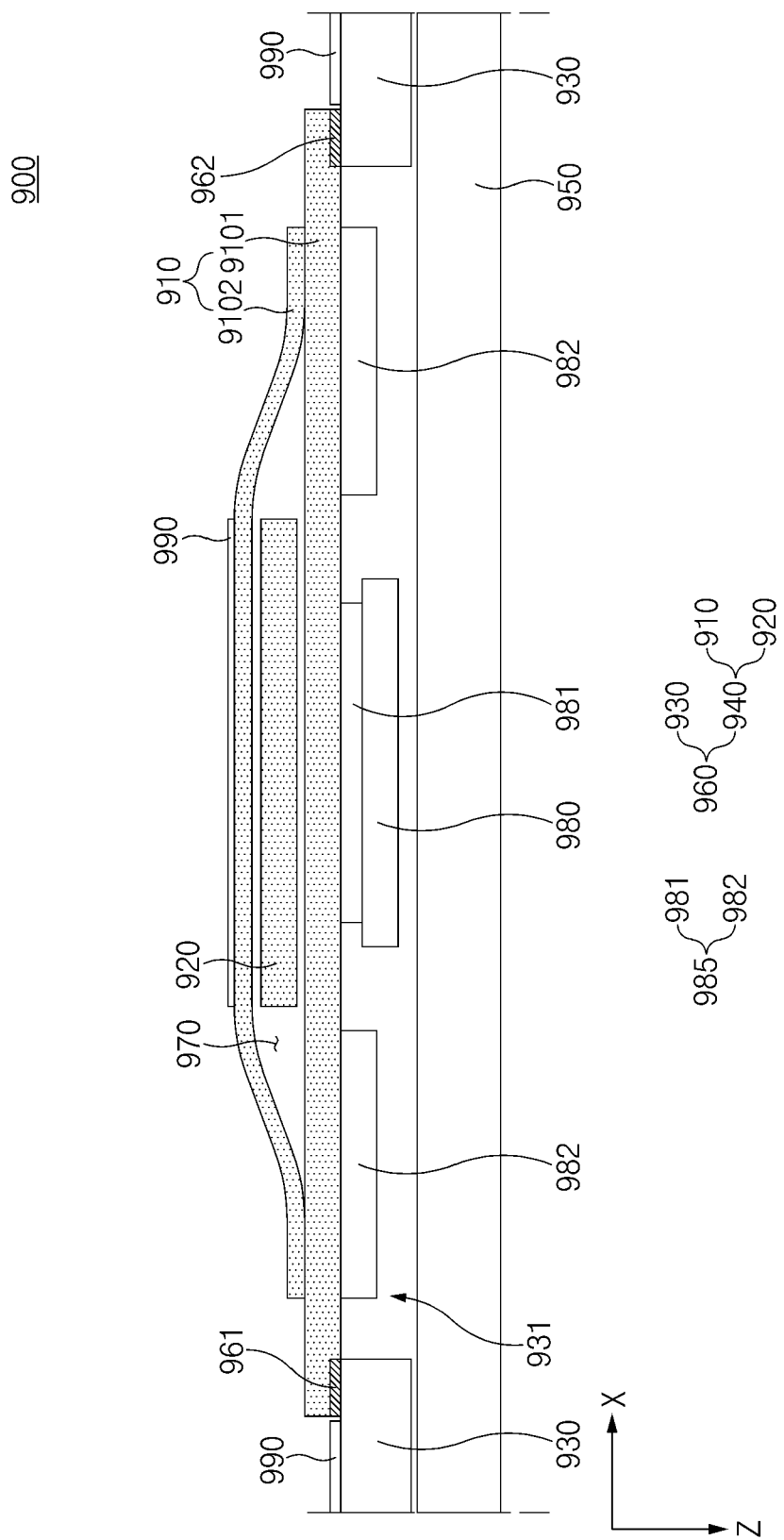
FIG. 9B illustrates a sensor panel including a contact prevention member according to an embodiment.

FIG. 9A illustrates an electronic device including a fingerprint sensor according to an embodiment. FIG. 9B illustrates an electronic device including a fingerprint sensor according to an embodiment.

Referring to FIGS. 9A and 9B, an electronic device 900 includes a display 950, a sensor panel 960, and a fingerprint sensor 980.

The sensor panel 960 includes a first sensor panel 930 and a second sensor panel 940. The first sensor panel 930 includes an opening area 931. The first sensor panel 930 may be electrically connected with a plurality of contact pads including first contact pads 961 and second contact pads 962 of the second sensor panel 940. The second sensor panel 940 includes a first circuit board 910 including a first sub-board 9101 and a second sub-board 9102 and a second circuit board 920. The second circuit board 920 may be accommodated in a receiving space 970 provided by a coupling of the first sub-board 9101 and the second sub-board 9102.

As illustrated in FIG. 9A, part of the first sensor panel 930 may face the first sub-board 9101 of the second sensor panel 940 in the front direction (e.g., the ±Z-axis direction) toward the display 950. The first contact pads 961 and the second contact pads 962 of the second sensor panel 940 may be disposed on the first sub-board 9101 to face the rear direction (e.g., the −Z-axis direction) opposite to the front direction. At least part of at least one of the second sub-board 9101 of the first circuit board 910 or the second circuit board 920 may be accommodated in the opening area 931 of the first sensor panel 930.

As illustrated in FIG. 9B, part of the first sensor panel 930 may face the first sub-board 9101 of the second sensor panel 940 in the rear direction. The first contact pads 961 and the second contact pads 962 of the second sensor panel 940 may be disposed on the first sub-board 9101 to face the front direction. At least one of the fingerprint sensor 980 or a contact prevention member 985 may be accommodated in the opening area 931 of the first sensor panel 930.

At least one thin-film function member 990 may be disposed on the second sub-board 9102. The thin-film function member 990 may be at least one of a shielding member or a heat radiating member. The thin-film function member 990 may be disposed on the first sensor panel 930. The thin-film function member 990 may also be disposed on the first sensor panel 930 and the thin-film function member 990 disposed on the second sub-board 9102 may perform the same function or different functions. For example, the thin-film function member 990 disposed on the first sensor panel 930 may be a heat radiating member, and the thin-film function member 990 disposed on the second sub-board 9102 may be a shielding member.

The fingerprint sensor 980 may be a fingerprint on display (FOD) disposed between the display 950 and the sensor panel 960. The fingerprint sensor 980 may be attached to the rear surface (e.g., the surface facing toward the −Z-axis direction) of the display 950, or may be disposed to be spaced apart from the display 950. The fingerprint sensor 980 may include an optical image sensor or an ultrasonic transmission/reception module.

The fingerprint sensor 980 may be disposed to be spaced apart from the first sub-board 9101 of the sensor module 960. The contact prevention member 985 may be disposed between the fingerprint sensor 980 and the sensor panel 960 to secure a sufficient separation distance between the fingerprint sensor 980 and the first sub-board 9101. The fingerprint sensor 980 may not be in contact with the first sub-board 9101 of the sensor module 960 by the contact prevention member 985. The contact prevention member 985 may include a first contact prevention member 981 and a second contact prevention member 982.

The first contact prevention member 981 may be disposed between the fingerprint sensor 980 and the first sub-board 9101 to overlap at least part of the fingerprint sensor 980. The first contact prevention member 981 may serve to prevent contact between the rear surface (e.g., the direction toward the −Z-axis direction) of the fingerprint sensor 980 and the first sub-board 9101.

The second contact prevention member 982 may be disposed between the display 950 and the first sub-board 9101 so as not to overlap the fingerprint sensor 980. The second contact prevention member 982 may have a different thickness from the first contact prevention member 981. For example, the second contact prevention member 982 may be formed to be thicker than the first contact prevention member 981. The second contact prevention member 982, which is thicker than the first contact prevention member 981, may face at least part of a side surface of the fingerprint sensor 980 and a side surface of the first contact prevention member 981. The second contact prevention member 982 may prevent contact between the side surface of the fingerprint sensor 980 and the first sub-board 9101. Alternatively, the second contact prevention member 982 may be integrally formed with the first contact prevention member 981.

The first sub-board 9101 included in the sensor panel may not be brought into contact with the fingerprint sensor 980 by the contact prevention member 985 including the first contact prevention member 981 and the second contact prevention member 982. Accordingly, the surface shape of the first sub-board 9101 may be prevented from being recognized as a fingerprint by the fingerprint sensor 980 due to a wavy surface or an uneven surface of the first sub-board 9101. For example, a failure phenomenon of the fingerprint sensor 980 occurring due to contact between a composite wavy surface formed on the second sensor panel 940 having a multi-layer structure, which includes the first circuit board 910 and the second circuit board 920, and the rear surface (e.g., the surface facing toward the −Z-axis direction) of the fingerprint sensor 980 may be prevented.

At least one of the first contact prevention member 981 or the second contact prevention member 982 may be formed of an elastic member (e.g., a rubber or sponge material) or an incompressible tape. The first contact prevention member 981 may be formed of an elastic member and the second contact prevention member 982 may be formed of an elastic member or an incompressible tape.

Figure 10A:
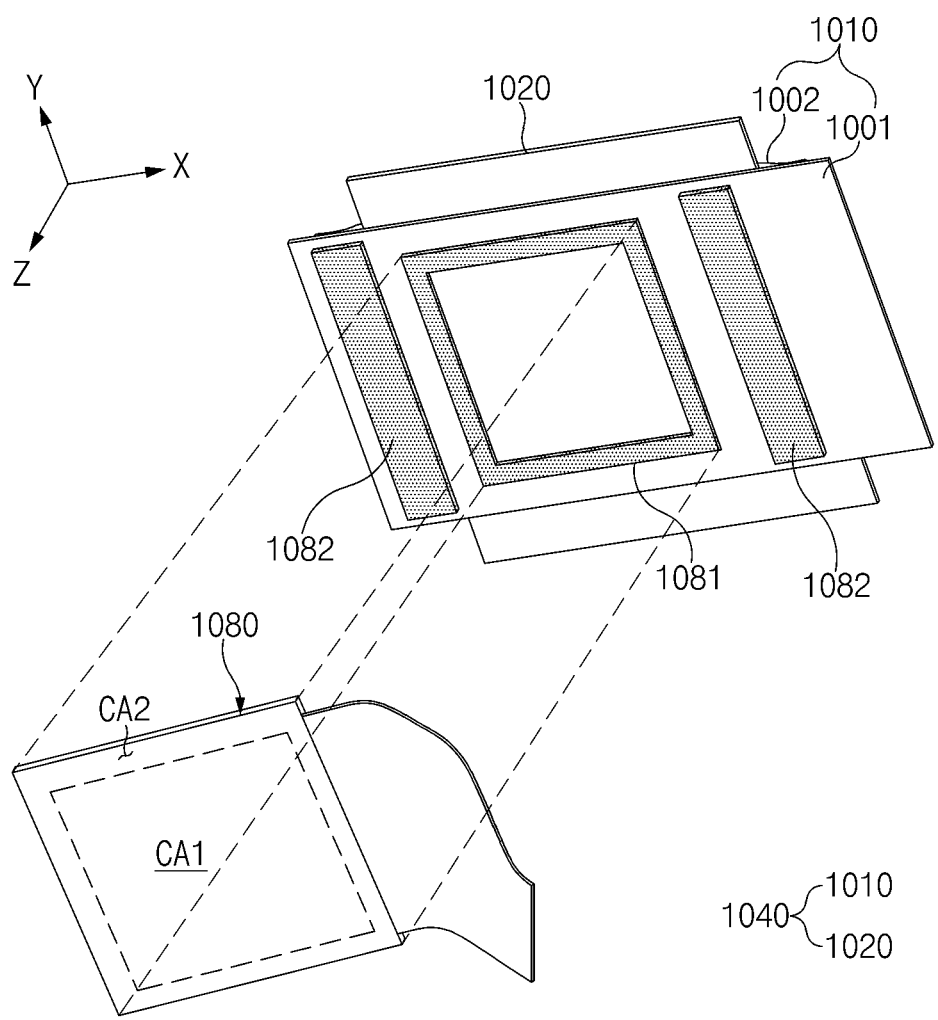
FIGS. 10A and 10B illustrate an arrangement relationship of a contact prevention member and a fingerprint sensor according to an embodiment.
Figure 10B:
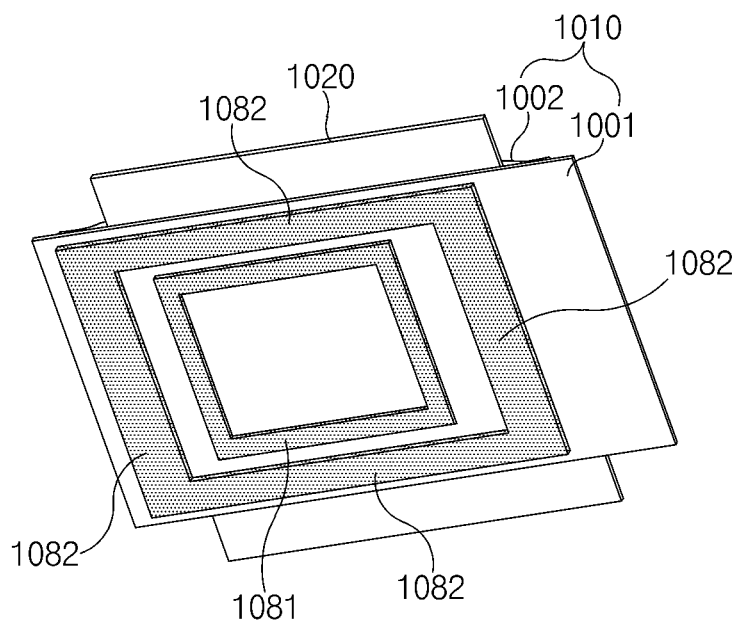

FIGS. 10A and 10B illustrate an arrangement relationship of a contact prevention member and a fingerprint sensor according to an embodiment.

More specifically, FIG. 10A illustrates an arrangement relationship of a second sensor panel, a first contact prevention member, a second contact prevention member, and a fingerprint sensor according to an embodiment, and FIG. 10B illustrates another embodiment of the second contact prevention member illustrated in FIG. 10A.

Referring to FIG. 10A, the fingerprint sensor 1080 may be formed on the front surface e.g., the surface facing toward the +Z-axis direction) of the second sensor panel 1040 including a first circuit board 1010 and a second circuit board 1020. Part of the second circuit board 1020 may be inserted into a receiving space formed by a coupling of a first sub-board 1001 and a second sub-board 1002 that are included in the first circuit board 1010.

The fingerprint sensor 1080 may include a first area CA1 and a second area CA2 surrounding the first area CA1. An optical image sensor or an ultrasonic transmission/reception module may be disposed on the first area CA1. The second area CA2, on which the optical image sensor or the ultrasonic transmission/reception module is not disposed, may be an area that does not affect fingerprint sensing.

The first contact prevention member 1081 may be formed along the periphery of the fingerprint sensor 1080. For example, as illustrated in FIG. 10A, the first contact prevention member 1081 may be formed in the shape of a rectangle frame that surrounds the periphery of the fingerprint sensor 1080. The first contact prevention member 1081 may overlap the second area CA2 of the fingerprint sensor 1080. The first contact prevention member 1081 may not overlap the first area CA1 of the fingerprint sensor 1080 so as not to obstruct fingerprint sensing.

The second contact prevention member 1082 may have a sidewall form surrounding at least one of the fingerprint sensor 1080 or the first contact prevention member 1081. For example, when the front surface (e.g., the surface facing toward the +Z-axis direction) of the first sub-board 1001 is viewed, the second contact prevention member 1082 may be formed in the shape of parallel lines, an "L", or a "U", by which part of the periphery of the first contact prevention member 1081 is open. As another example, as illustrated in FIG. 10B, when the front surface (e.g., the surface facing toward the +Z-axis direction) of the first sub-board 1001 is viewed, the second contact prevention member 1082 may be formed in the shape of a rectangle frame that surrounds the periphery of the first contact prevention member 1081.

Figure 11A:
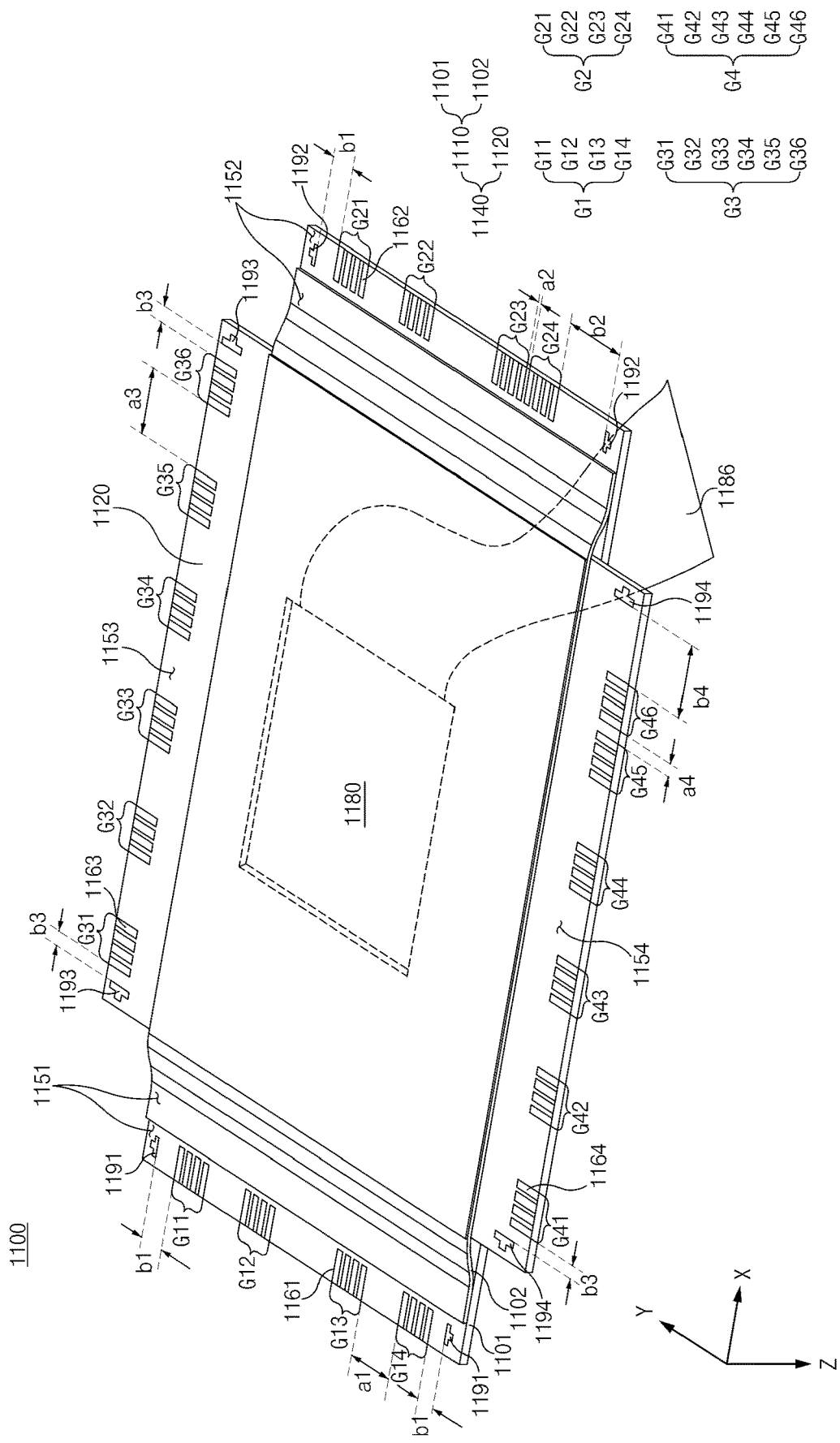
FIGS. 11A and 11B illustrate an arrangement relationship between a sensor circuit board and contact pads according to an embodiment.
Figure 11B:
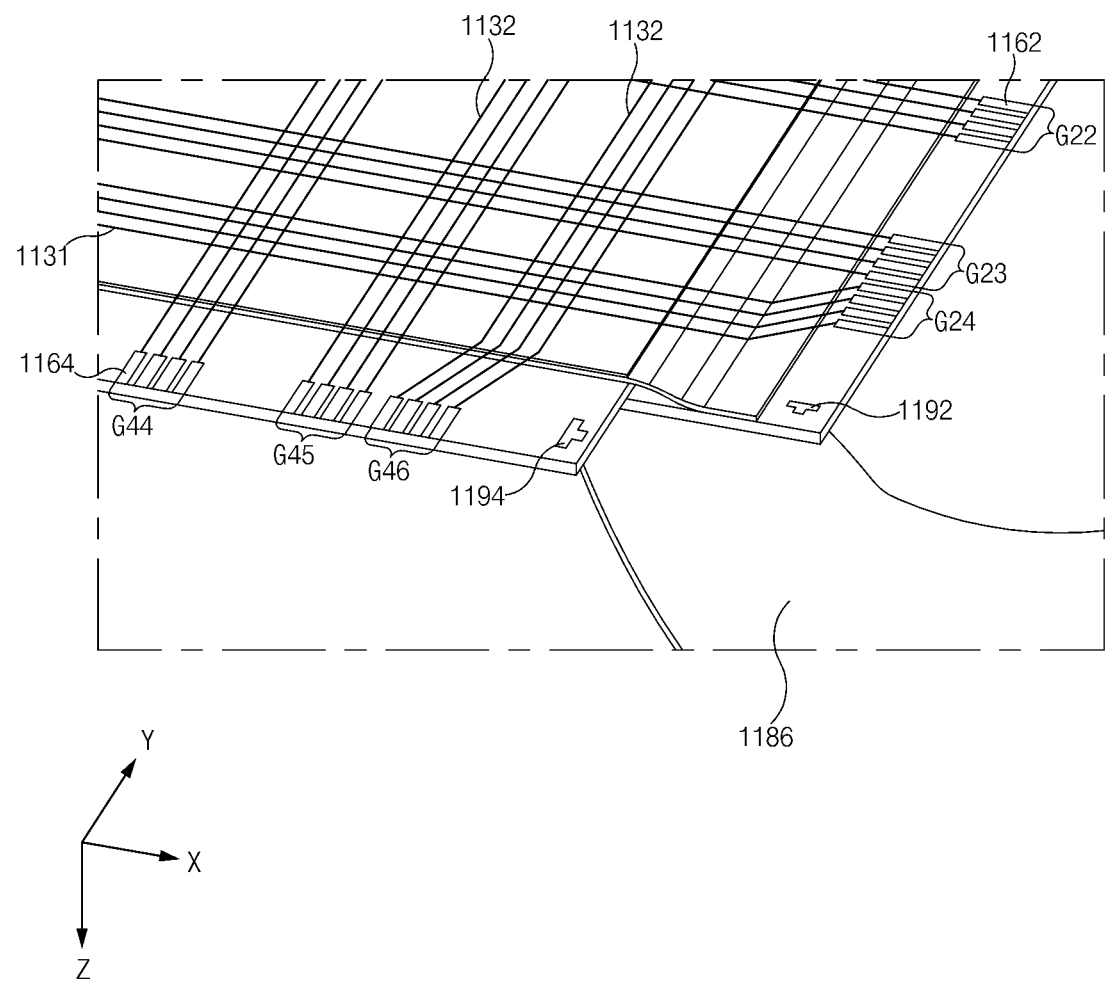

FIGS. 11A and 11B illustrate an arrangement relationship of a fingerprint sensor and a second sensor panel included in an electronic device according to an embodiment.

Referring to FIGS. 11A and 11B, an electronic device 1100 includes a second sensor panel 1140, a fingerprint sensor 1180 and a sensor circuit board 1186.

The second sensor panel 1140 includes a first circuit board 1110 including a first sub-board 1101 and a second sub-board 1102 and a second circuit board 1120.

The first sub-board 1101 includes a plurality of first alignment marks 1191 and a plurality of second alignment marks 1192. A plurality of first contact pads 1161 may be arranged between the plurality of first alignment marks 1191. A plurality of second contact pads 1162 may be arranged between the plurality of second alignment marks 1192. The second circuit board 1120 includes a plurality of third alignment marks 1193 and a plurality of fourth alignment marks 1194. A plurality of third contact pads 1163 may be arranged between the plurality of third alignment marks 1193. A plurality of fourth contact pads 1164 may be arranged between the plurality of fourth alignment marks 1194.

The first to fourth alignment marks 1191, 1192, 1193, and 1194 of the second sensor panel 1140 may be used to determine the position where the second sensor panel 1140 is bonded with a first sensor panel. The first to fourth alignment marks 1191, 1192, 1193, and 1194 of the second sensor panel 1140 may be aligned with a plurality of alignment marks that are formed on the first sensor panel, and thus, the second sensor panel 1140 may be bonded to an accurate position on the first sensor panel. The first to fourth alignment marks 1191, 1192, 1193, and 1194 may be formed in the shape of a "T" or "+".

The sensor circuit board 1186 may be electrically connected with the fingerprint sensor 1180. The sensor circuit board 1186 may extend from the fingerprint sensor 1180 and may be extracted outside the second sensor panel 1140.

The size of the fingerprint sensor 1180 may correspond to the overlapping area of the first circuit board 1110 and the second circuit board 1120, or may be smaller than the overlapping area. The overlapping area of the first circuit board 1110 and the second circuit board 1120 may not be a positive power of the area of the fingerprint sensor 118. For example, the overlapping area of the first circuit board 1110 and the second circuit board 1120 may be a rectangle, and the fingerprint sensor may be a square smaller than the overlapping area of the first circuit board 1110 and the second circuit board 1120.

When the size of the fingerprint sensor 1180 is smaller than the overlapping area of the first circuit board 1110 and the second circuit board 1120, the sensor circuit board 1186 may extend through between adjacent extending areas 1151, 1152, 1153, and 1154.

Hereinafter, for convenience of description, a structure in which the sensor circuit board 1186 is extracted to the outside through between the second extending area 1152 and the fourth extending area 1154 will be described as an example. However, it will be understood by those skilled in the art that there is no limitation in the position of the sensor circuit board 1186 because the sensor circuit board 1186 extends through between the first extending area 1151 and the third extending area 1153, extends through between the first extending area 1151 and the fourth extending area 1154, or extends through between the second extending area 1152 and the third extending area 1153.

At least two first pad groups G1, each of which includes a plurality of first contact pads 1161, may be disposed on the first extending area 1151. The at least two first pad groups G1 may include pad group 11 G11, pad group 12 G12, pad group 13 G13, and pad group 14 G14, but may be variously changed without being limited thereto. The at least two first pad groups may be spaced apart from each other at a predetermined interval. The first pad group (e.g., pad group 11 G11) and the last pad group (e.g., pad group 14 G14) located on opposite sides among the at least two first pad groups may be spaced apart from the first alignment marks 1191 by a predetermined distance b1. The separation distance b1 between pad group 11 G11 and the first alignment mark 1191 may be similar or equal to the separation distance b1 between pad group 14 G14 and the first alignment mark 1191.

At least two second pad groups G2, each of which includes a plurality of second contact pads 1162, may be disposed on the second extending area 1152. The at least two second pad groups G2 may include pad group 21 G21, pad group 22 G22, pad group 23 G23, and pad group 24 G24 but may be variously changed without being limited thereto.

The last second pad group G2 among the at least two second pad groups G2 may be disposed relatively close to the adjacent second pad group G2. Accordingly, pad group 24 G24, which is the last pad group among the plurality of second pad groups G2, and pad group 14 G14, which is the last pad group among the plurality of first pad groups G1, may not be disposed on the same line. The separation distance a2 between pad group 24 G24 and pad group 23 G23 adjacent to pad group 24 G24 may be smaller than the separation distance a1 between pad group 14 G14 and pad group 13 G13 adjacent to pad group 14 G14.

As illustrated in FIG. 11B, some of the plurality of first bridge lines 1131 connecting the plurality of first pad groups G1 and the plurality of second pad groups G2 may be formed in a straight-line form, and the other first bridge lines 1131 may be formed in an oblique-line form. For example, the first bridge lines 1131 electrically connecting the first contact pads 1161 included in pad groups 11 to 13 G11, G12, and G13 and the second contact pads 1162 included in pad groups 21 to 23 G21, G22, and G23 may be formed in a straight-line form. At least parts of the first bridge lines 1131 electrically connecting the first contact pads 1161 of pad group 14 G14 and the second contact pads 1162 of pad group 24 G24 may be formed to be inclined with respect to the first bridge lines 1131 having a straight-line form.

The separation distance b1 between pad group 21 G21, which is the first pad group among the at least two second pad groups G2, and the second alignment mark 1192 and the separation distance b2 between pad group 24 G24, which is the last pad group among the second pad groups G2, and the second alignment mark 1192 may differ from each other. The separation distance b1 between pad group 21 G21 and the second alignment mark 1192 may be smaller than the separation distance b2 between pad group 24 G24 and the second alignment mark 1192. Accordingly, the second contact pads 1162 included in the at least two second pad groups G2 may be spaced apart from the sensor circuit board 1186, or may be disposed so as not to overlap the sensor circuit board 1186. Signal interference between the second contact pads 1162 included in the second pad groups G2 and the sensor circuit board 1186 of the fingerprint sensor 1180 may be prevented.

At least two third pad groups G3, each of which includes a plurality of third contact pads 1163, may be disposed on the third extending area 1153. The at least two third pad groups G3 may include pad group 31 G31, pad group 32 G32, pad group 33 G33, pad group 34 G34, pad group 35 G35, and pad group 36 G36, but may be variously changed without being limited thereto.

At least two fourth pad groups G4, each of which includes a plurality of fourth contact pads 1164, may be disposed on the fourth extending area 1154. The at least two fourth pad groups G4 may include pad group 41 G41, pad group 42 G42, pad group 43 G43, pad group 44 G44, pad group 45 G45, and pad group 46 G46, but may be variously changed without being limited thereto.

The last fourth pad group G4 among the at least two fourth pad groups G4 may be disposed relatively close to the adjacent fourth pad group G4 so as not to overlap the sensor circuit board 1186. Accordingly, pad group 46 G46, which is the last pad group among the plurality of fourth pad groups G4, and pad group 36 G36, which is the last pad group among the plurality of third pad groups G3, may not be disposed on the same line. The separation distance a4 between pad group 46 G46 and pad group 45 G45 adjacent to pad group 46 G46 may be smaller than the separation distance a3 between pad group 36 G36 and pad group 35 G35 adjacent to pad group 36 G36.

As illustrated in FIG. 11B, some of the plurality second bridge lines 1132 connecting the plurality of third pad groups G3 and the plurality of fourth pad groups G4 may be formed in a straight-line form, and the other second bridge lines 1132 may be formed in an oblique-line form. The second bridge lines 1132 electrically connecting the third contact pads 1163 included in pad groups 31 to 35 G31, G32, G33, G34, and G35 and the fourth contact pads 1164 included in pad groups 41 to 45 G41, G42, G43, G44, and G45 may be formed in a straight-line form. At least parts of the second bridge lines 1132 electrically connecting the third contact pads 1163 of pad group 36 G36 and the fourth contact pads 1164 of pad group 46 G46 may be formed to be inclined with respect to the second bridge lines 1132 having a straight-line form.

The separation distance b3 between pad group 41 G41, which is the first pad group among the at least two fourth pad groups G4, and the fourth alignment mark 1194 and the separation distance b4 between pad group 46 G46, which is the last pad group among the fourth pad groups G4, and the fourth alignment mark 1194 may differ from each other. The separation distance b3 between pad group 41 G41 and the fourth alignment mark 1194 may be smaller than the separation distance b4 between pad group 46 G46 and the fourth alignment mark 1194. Accordingly, the fourth contact pads 1164 included in the at least two fourth pad groups G4 may be spaced apart from the sensor circuit board 1186, or may be disposed so as not to overlap the sensor circuit board 1186. Signal interference between the second contact pads 1164 included in the fourth pad groups G4 and the sensor circuit board 1186 of the fingerprint sensor 1180 may be prevented.

As described above, the positions of the contact pads 1161, 1162, 1163, and 1164 may be changed so as to be spaced apart from the sensor circuit board 1186 or so as not to overlap the sensor circuit board 1186. Additionally, by increasing the number of layers of the sensor circuit board 1186, the position of a conductive layer inside the sensor circuit board 1186 may be changed such that the conductive layer disposed inside the sensor circuit board 1186 does not overlap the contact pads 1161, 1162, 1163, and 1164.

Figure 12A:
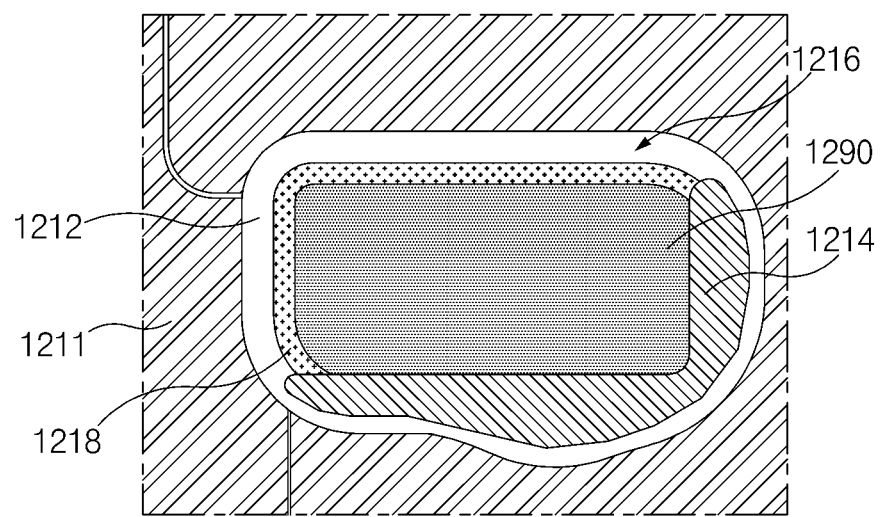
FIG. 12A illustrates a partial area of a first support member overlapping at least one of a first sensor panel or a second sensor panel of an electronic device according to an embodiment.
Figure 12B:
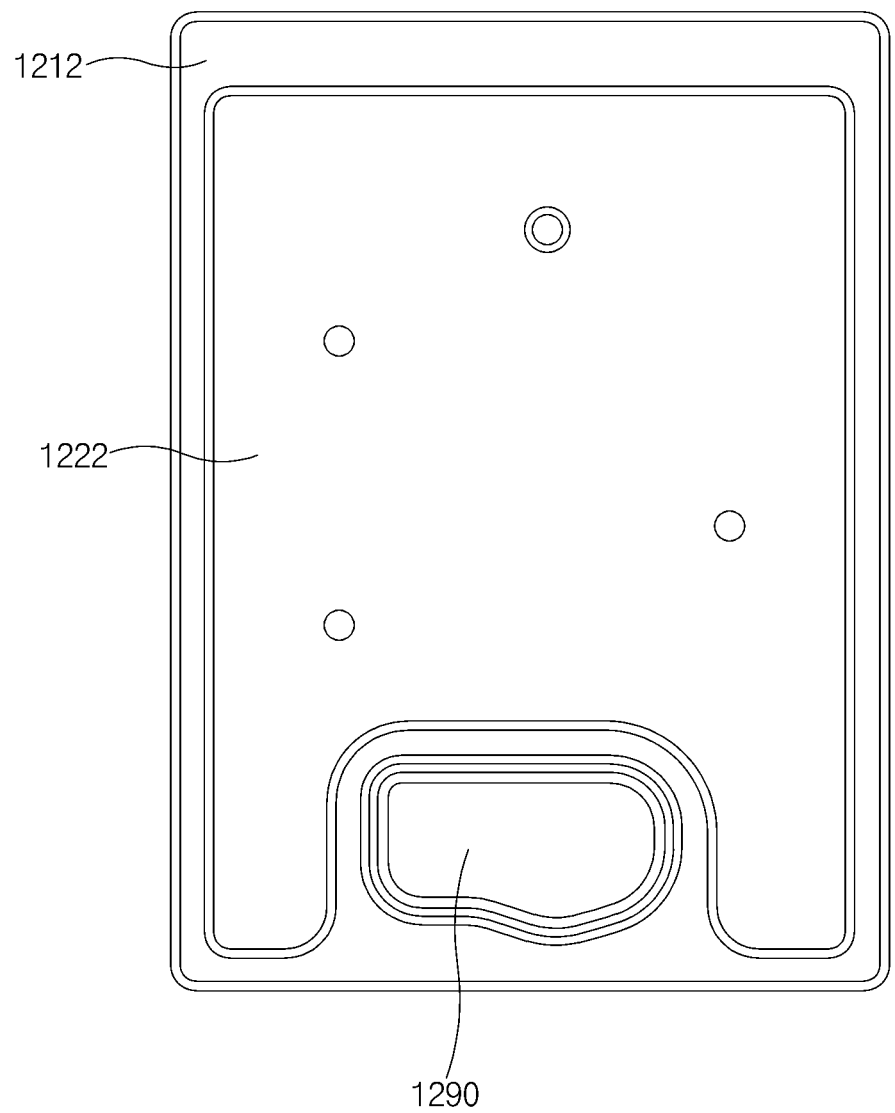
FIGS. 12B and 12C illustrate a first auxiliary function member and a second auxiliary function member attached to a battery illustrated in FIG. 12A, according to an embodiment.
Figure 12C:
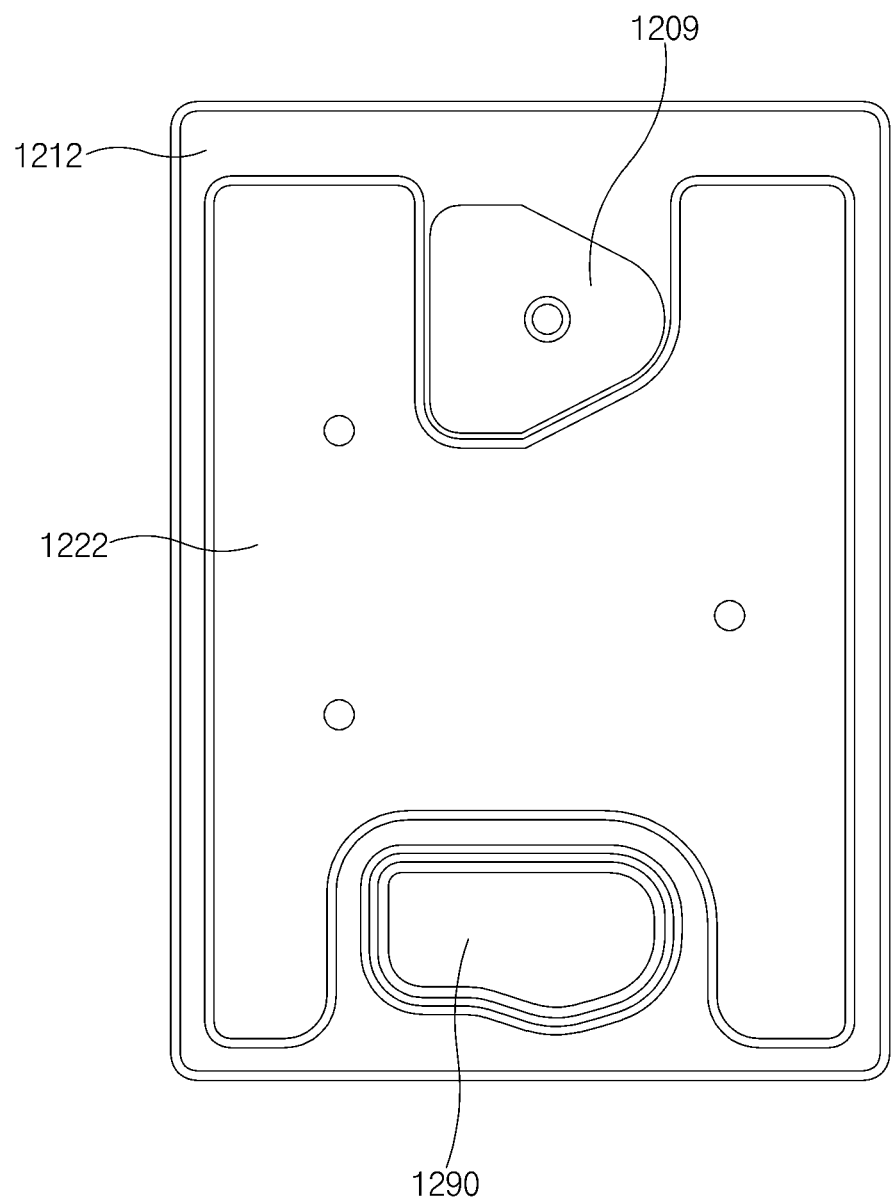

FIG. 12A illustrates a partial area of a first support member overlapping at least one of a first sensor panel or a second sensor panel of an electronic device according to an embodiment. FIGS. 12B and 12C illustrate a first auxiliary function member and a second auxiliary function member attached to a battery illustrated in FIG. 12A, according to an embodiment.

More specifically, FIG. 12A illustrates a partial area of a first support member having a second opening area overlapping a second sensor panel of an electronic device according to an embodiment, and FIGS. 12B and 12C illustrate a first auxiliary function member and a second auxiliary function member attached to a battery illustrated in FIG. 12A.

Referring to FIG. 12A, a first support member 1211 includes a second opening area 1216. The second opening area 1216 may be disposed to correspond to an opening area of a first sensor panel. Part of the battery 1212 accommodated between the first support member and a second support member may overlap the second opening area 1216.

The first auxiliary function member 1290 may be attached to at least a partial area of the battery 1212 that overlaps the second opening area 1216. The second auxiliary function member 1222 illustrated in FIGS. 12B and 12C may be attached to at least a partial area of the battery 1212 that does not overlap the second opening area 1216.

As illustrated in FIG. 12C, a second auxiliary function member 1222 may be disposed to avoid a surrounding structure 1209 disposed in the vicinity of the battery 1212.

At least one of the first auxiliary function member 1290 or the second auxiliary function member 1222 may be configured separately from a thin-film function member attached to the second sensor panel. The first auxiliary function member 1290 may perform the same function as, or a different function from, the thin-film function member. For example, the thin-film function member may be one of a heat radiating member or a shielding member, the first auxiliary function member 1290 may be a shielding member, and the second auxiliary function member 1222 may be a heat radiating member. Alternatively, the first auxiliary function member 1290 may be integrated with the thin-film function member disposed on the second sensor panel, and the second auxiliary function member 1222 may be integrated with a thin-film function member disposed on the first sensor panel.

The first auxiliary function member 1290 may be a shielding member that blocks noise such that the magnetic force of the second sensor panel overlapping a fingerprint sensor is not degraded. For example, the first auxiliary function member 1290 may prevent an eddy current that degrades the magnetic force of the second sensor panel on the surface of the battery. Accordingly, the first auxiliary function member 1290 may prevent the magnetic force of the sensor panel from being weakened by the battery and/or a surrounding electrical structure.

The first auxiliary function member 1290 may be a shielding member formed of MMP. To prevent the MMP included in the first auxiliary function member 1290 from being lost, the first auxiliary function member 1290 may be accommodated in an encapsulation member 1218. The encapsulation member 1218 may be formed to surround the entire surface of the first auxiliary function member 1290.

When the first support member 1211 is viewed from above, a partition wall member 1214 may be disposed between at least one of the first auxiliary function member 1290 or the encapsulation member 1218 and the first support member 1211. The partition wall member 1214 may be formed to face at least one side surface among a plurality of side surfaces of at least one of the first auxiliary function member 1290 or the encapsulation member 1218. For example, the partition wall member 1214 may be formed in the shape of an inverted "L" or in a frame form that surrounds four side surfaces of at least one of the first auxiliary function member 1290 or the encapsulation member 1218.

The partition wall member 1214, when viewed from the cross-section, may be disposed between at least one of the first sensor panel or the second sensor panel and the battery 1212. The partition wall member 1214 may prevent sagging of the first sensor panel and the second sensor panel. Further, the partition wall member 1214 may prevent a conductive bonding area between the first sensor panel and the second sensor panel that protrudes toward the battery 1212 from making contact with the battery 1212, thereby preventing a dent defect of the battery 1212. The partition wall member 1214 may be formed of a rubber material having low permanent strain. For example, the partition wall member 1214 may be formed of PORON®.

Figure 13A:
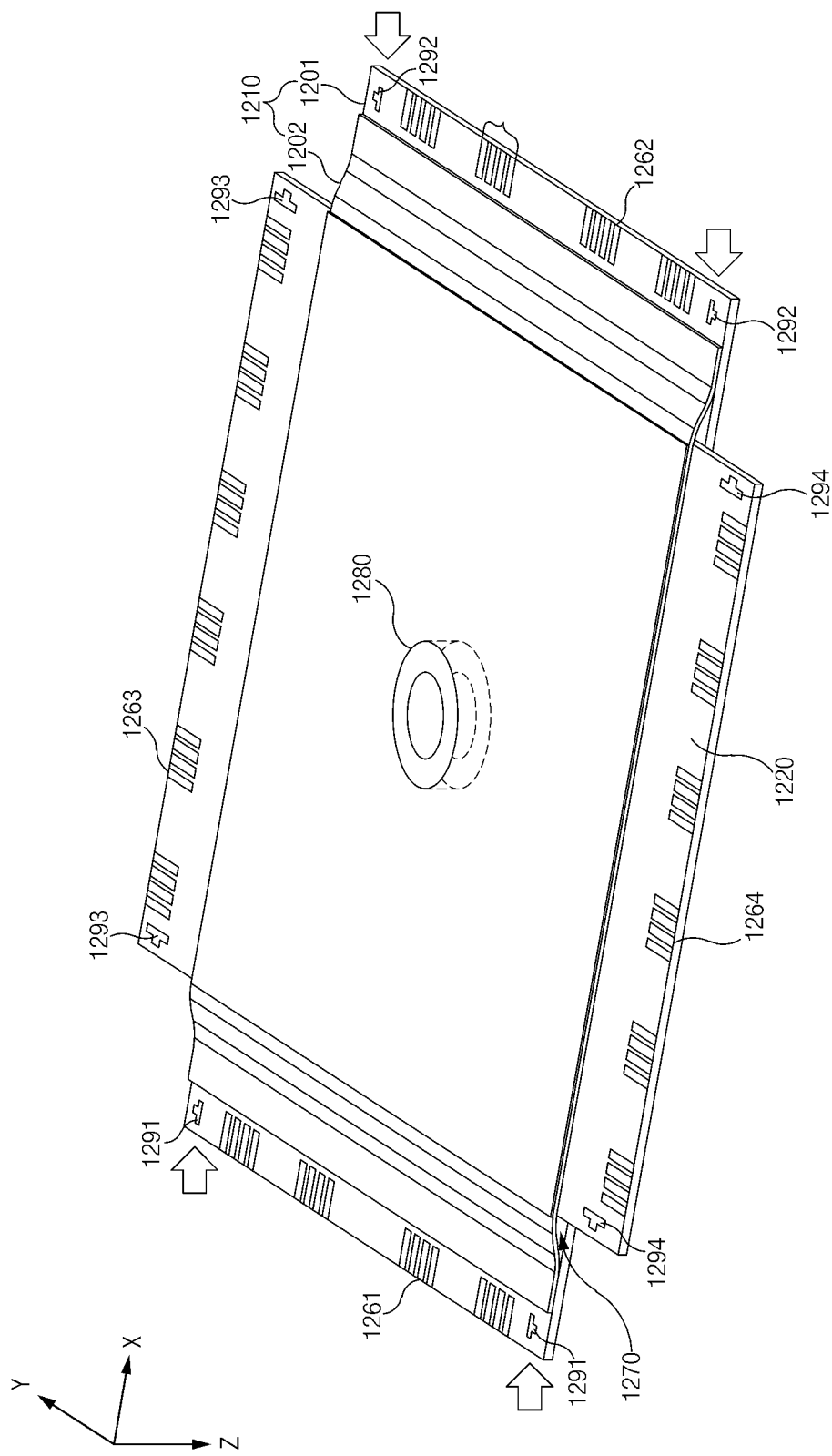
FIGS. 13A and 13B illustrate an attachment process of a second sensor panel according to an embodiment.
Figure 13B:
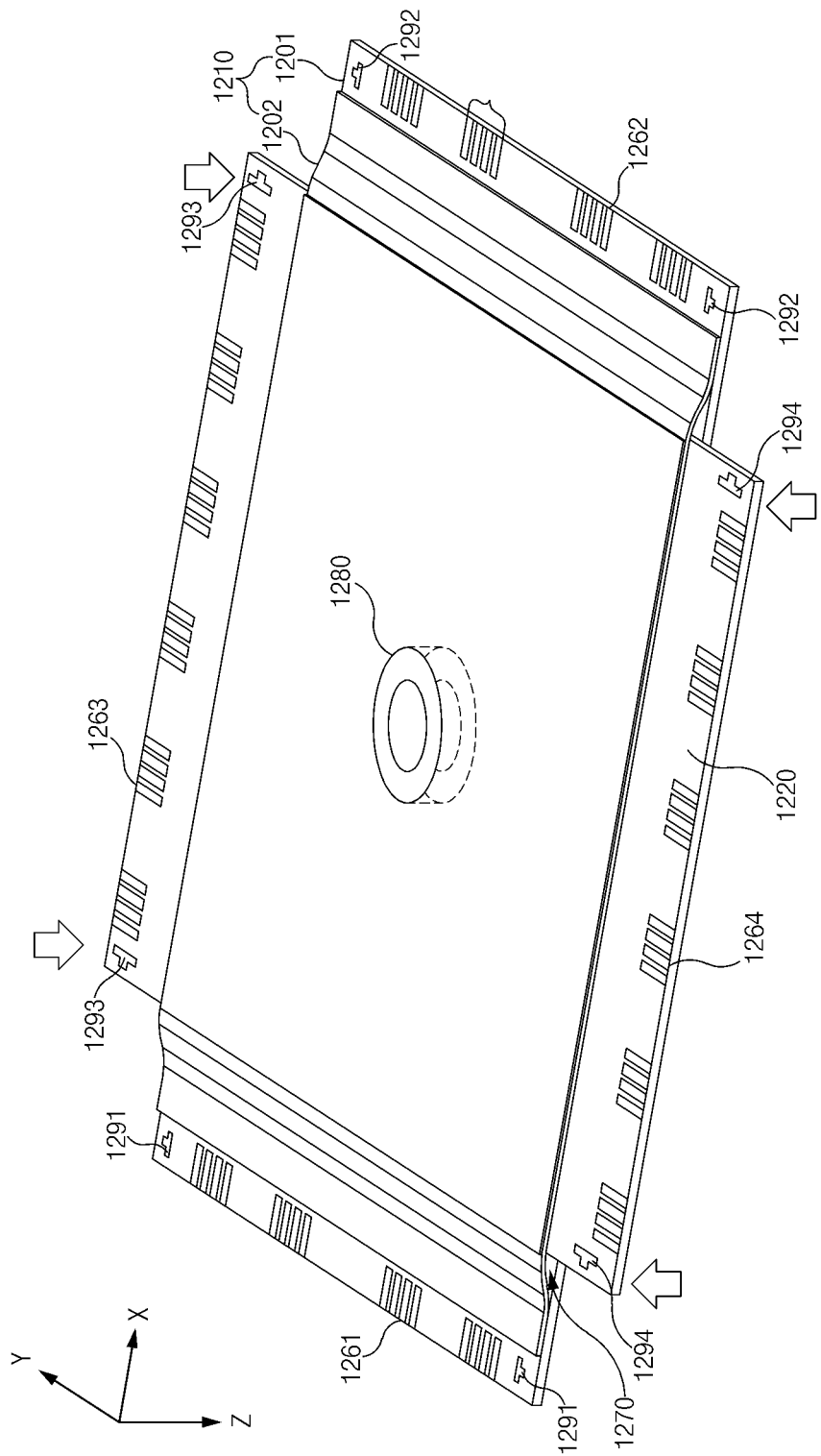

FIGS. 13A and 13B illustrate an attachment process of a second sensor panel of an electronic device according to an embodiment.

Referring to FIG. 13A, a first circuit board 1210 including a first sub-board 1201 and a second sub-board 1202 may be provided, and a second circuit board 1220 inserted into a receiving space 1270 formed by the first sub-board 1201 and the second sub-board 1202 may be included.

The first circuit board 1210 may be aligned with a first sensor panel through a plurality of first alignment marks 1291 and a plurality of second alignment marks 1292. The first circuit board 1210 aligned with the first sensor panel may be bonded to the first sensor panel through a jet soldering process. A plurality of first contact pads 1261 and a plurality of second contact pads 1262 of the first circuit board 1210 may make electrical contact with the first sensor panel.

Thereafter, whether there is a defect in the soldering process of the first circuit board 1210 may be determined by identifying the waving level and flatness of the first circuit board 1210. When it is determined that the soldering process of the first circuit board 1210 is non-defective, the second circuit board 1220 may be aligned with the first sensor panel through a plurality of third alignment marks 1293 and a plurality of fourth alignment marks 1294.

As illustrated in FIG. 13B, the withdrawal position and angle of the second circuit board 1220 may be adjustable through the plurality of third alignment marks 1293 and the plurality of fourth alignment marks 1294. The second circuit board 1220 aligned with the first sensor panel may be bonded to the first sensor panel through a jet soldering process. The plurality of third contact pads 1263 and the plurality of fourth contact pads 1264 of the second circuit board 1220 may make electrical contact with the first sensor panel.

A fixing holder member 1280 may be disposed in the first circuit board 1210 and the second circuit board 1220 to prevent separation of the second circuit board 1220 from the receiving space 1270 of the first circuit board 1210 in a process of transportation or while a process is performed.

Due to an error in a process, at least one of the first circuit board 1210 or the second circuit board 1220 may be attached to the first sensor panel in a state of being slightly misaligned. Deviation information for each product that is formed by the tilt angle of at least one of the first circuit board 1210 or the second circuit board 1220 may be automatically reflected in firmware included in a sensor module. Output information of a sensor panel or input information of a stylus pen may be corrected with a compensation value corresponding to the deviation information for each product that is generated through the tilt angle.

The electronic, ice may be a foldable electronic device including a foldable display.

Figure 14:
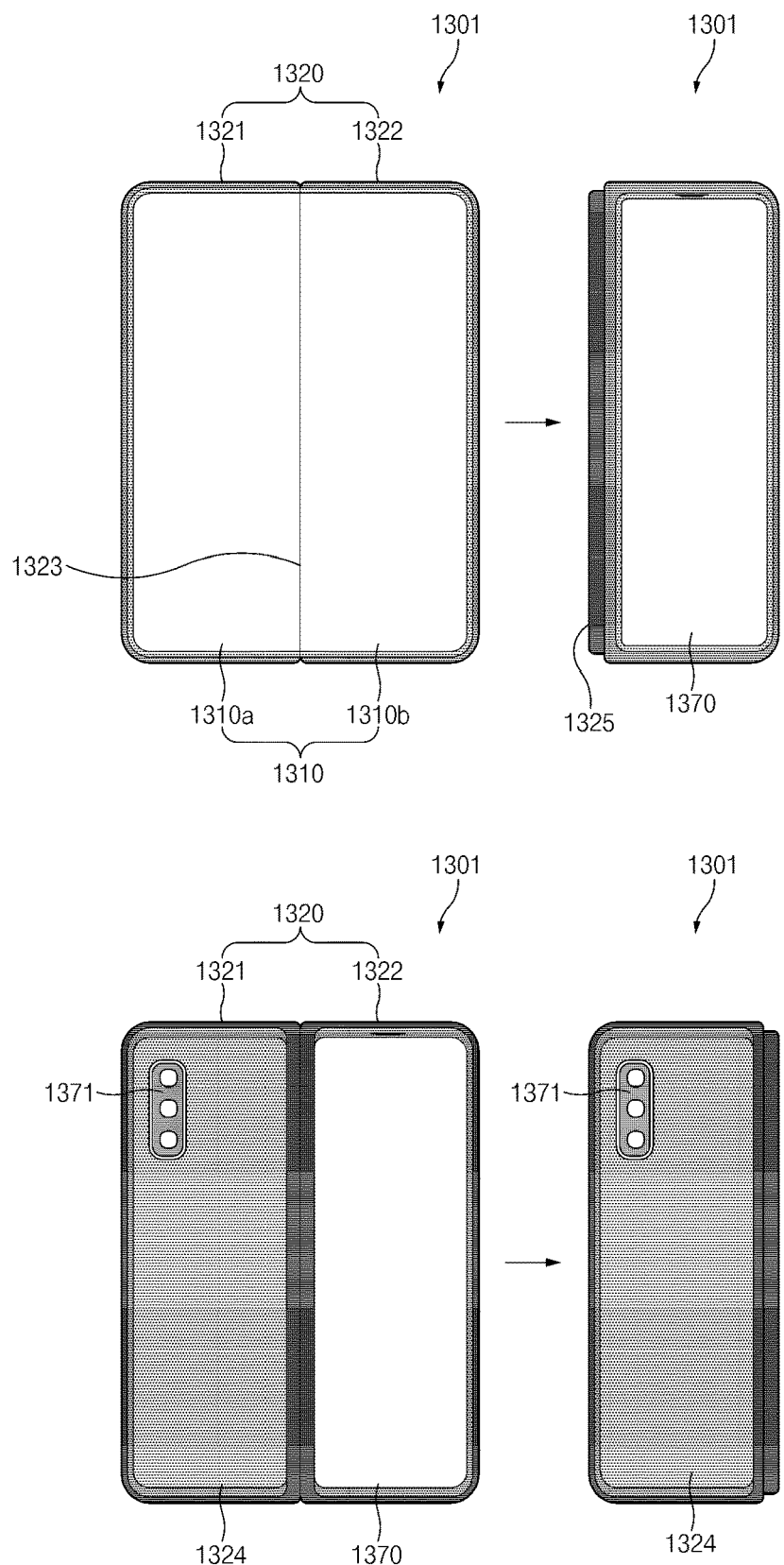
FIG. 14 illustrates a fully folded state and a fully unfolded state of a foldable electronic device according to an embodiment.

FIG. 14 illustrates a foldable electronic device according to an embodiment.

Referring to FIG. 14, a foldable electronic device 1301 includes a flexible display 1310 and a housing 1320. The foldable electronic device 1301 and flexible display 1310 may be folded about a folding line 1323.

The flexible display 1310 includes a first display area 1310*a* and a second display area 1310*b*. The first display area 1310*a* and the second display area 1310*b* may display various types of content.

For example, the first display area 1310*a* and the second display area 1310*b* may be in an unfolded state depending on rotation of a hinge structure 1325. In the unfolded state, the first display area 1310*a* and the second display area 1310*b* may form one plane. In the unfolded state, content may be displayed by using the first display area 1310*a* and the second display area 1310*b*. The electronic device 1301 may display content using at least one of the first display area 1310*a* or the second display area 1310*b* depending on the angle formed by a first housing 1321 and a second housing 1322.

The electronic device 1301 may display an execution screen of an application, a home screen, a lock screen, or an always on display (AOD) screen on at least one of the first display area 1310*a* or the second display area 1310*b* by a processor of the electronic device 1301.

The housing 1320 may be folded about the folding line 1323. The housing 1320 includes the first housing 1321 and the second housing 1322. The first housing 1321 and the second housing 1322 may be connected by the hinge structure 1325 disposed in the portion corresponding to the folding line 1323. The first housing 1321 and the second housing 1322 may be unfolded or folded by rotation of the hinge structure 1325. The first housing 1321 and the second housing 1322 may be geometrically deformed as the mutual arrangement of the first housing 1321 and the second housing 1322 varies with respect to the hinge structure 1325 forming the folding line 1323. For example, the first housing 1321 and the second housing 1322 may be disposed at a specific angle of 0 degrees to 180 degrees with respect to the hinge structure 1325.

The first housing 1321 may have the first display area 1310*a* mounted therein. The first display area 1310*a* may rotate together as the first housing 1321 rotates. The second housing 1322 may have the second display area 1310b mounted therein. The second display area 1310b may rotate together as the second housing 1322 rotates.

The foldable electronic device 1301 may include a separate sub-display 1370 on a surface facing away from the surface on which the flexible display 1310 is mounted. The sub-display 1370 may be mounted on the rear surface of the first housing 1321. The sub-display 1370 may operate when the flexible display 1310 is folded. The sub-display 1370 may have a smaller area than the flexible display 1310. The sub-display 1370 may not be flexible. The electronic device 1301 may display content using the sub-display 1370 in a fully folded state.

The foldable electronic device 1301 may include a rear case 1324 mounted on a surface facing away from the surface on which the flexible display 1310 is mounted. The rear case 1324 may be mounted on the rear surface of the second housing 1322.

The foldable electronic device 1301 may include, on the surface facing away from the surface on which the flexible display 1310 is mounted, a camera module 1371 exposed through the rear case 1324. The camera module 1371 may be mounted on the rear surface of the second housing 1322. A separate display may not be mounted on the rear surface of the second housing 1322.

An electronic device according to the various embodiments of the disclosure may include a tablet personal computer (PC) and/or a notebook PC of a bar type, a foldable type, a rollable type, a sliding type, or a wearable type. The electronic device may also include various other electronic devices without being limited to the above-described examples.

An electronic device according to an embodiment may include a housing, a display disposed in the housing, and a sensor panel that is disposed between the display and the housing and that senses input information of a stylus pen. The sensor panel may include a first sensor panel including an opening area and a second sensor panel disposed to cover at least part of the opening area and electrically connected with the first sensor panel. The second sensor panel may include a first circuit board including a first sub-board and a second sub-board disposed such that parts thereof are spaced apart from each other to form a receiving space and a second circuit board, at least part of which is accommodated in the receiving space and surrounded by the first circuit board.

The first sensor panel may include a plurality of first conductive lines and a plurality of second conductive lines disposed to cross each other in the remaining area other than the opening area. The first circuit board may include a plurality of first bridge lines that electrically connect the first conductive lines separated by the opening area. The second circuit board may include a plurality of second bridge lines that electrically connect the second conductive lines separated by the opening area.

The plurality of first bridge lines may be disposed on at least one of the first sub-board or the second sub-board.

The first circuit board may include a plurality of first contact pads disposed on a first extending area extending in a first direction further than the second circuit board and a plurality of second contact pads disposed on a second extending area extending in a second direction opposite to the first direction further than the second circuit board. The second circuit board may include a plurality of third contact pads disposed on a third extending area extending in a third direction crossing the first direction further than the first circuit board and a plurality of fourth contact pads disposed on a fourth extending area extending in a fourth direction opposite to the third direction further than the first circuit board.

Between the first contact pads and the second contact pads, the first bridge lines may electrically connect the first contact pads and the second contact pads, and between the third contact pads and the fourth contact pads, the second bridge lines may electrically connect the third contact pads and the fourth contact pads.

The electronic device may further include at least one through-hole formed through the first sub-board, the second sub-board, and the second circuit board and a fixing holder member inserted into the through-hole.

The at least one through-hole may include a first through-hole formed through the first sub-board, a second through-hole formed through the second sub-board, and a third through-hole formed through the second circuit board. The third through-hole may have a larger diameter than at least one of the first through-hole or the second through-hole.

The fixing holder member may include a first holder area that faces the first sub-board and has a larger diameter than the first through-hole, a second holder area that faces the second sub-board and has a larger diameter than the second through-hole, and a third holder area that is inserted into the first to third through-holes and that has a smaller diameter than the first to third through-holes.

The fixing holder member may be formed of a rubber material.

The electronic device may further include a fingerprint sensor disposed between the second sensor panel and the display and a sensor circuit board connected with the fingerprint sensor.

The fixing holder member may be disposed at the center of the fingerprint sensor or at the center of an overlapping area of the first sub-board and the second sub-board.

The electronic device may further include a first contact prevention member disposed between a front surface of the first sub-board that faces toward the display and the fingerprint sensor and a second contact prevention member disposed to surround at least one side of the contact prevention member.

The second contact prevention member may be thicker than the first contact prevention member.

A separation distance between a plurality of contact pads and an alignment mark that are close to the sensor circuit board may be greater than a separation distance between a plurality of contact pads and an alignment mark that are far away from the sensor circuit board.

The electronic device may further include a shielding layer disposed on a rear surface of the second sub-board that faces toward the housing.

An electronic device according to an embodiment may include a housing, a display disposed in the housing, a sensor panel that is disposed between the display and the housing and that senses input information of a stylus pen, and a fingerprint sensor disposed between the sensor panel and the display. The sensor panel may include a first sensor panel including an opening area and a second sensor panel that overlaps the fingerprint sensor and that is disposed to cover at least part of the opening area and electrically connected with the first sensor panel. The second sensor panel may include a first circuit board including a first sub-board and a second sub-board disposed such that parts thereof are spaced apart from each other to form a receiving space and a second circuit board, at least part of which is accommodated in the receiving space and surrounded by the first circuit board, a volume of the second circuit board in the receiving space being smaller than the receiving space.

The electronic device may further include at least one through-hole formed through the first sub-board, the second sub-board, and the second circuit board and a fixing holder member inserted into the through-hole.

The electronic device may further include a first contact prevention member disposed between a front surface of the first sub-board that faces toward the display and the fingerprint sensor and a second contact prevention member disposed to surround at least one side of the first contact prevention member.

The electronic device may further include alignment marks disposed on the first circuit board and the second circuit board, respectively, and a sensor circuit board connected with the fingerprint sensor. A separation distance between a plurality of contact pads and an alignment mark that are close to the sensor circuit board may be greater than a separation distance between a plurality of contact pads and an alignment mark that are far away from the sensor circuit board.

The electronic device may further include a shielding layer disposed on a rear surface of the second sub-board that faces toward the housing.

The various embodiments of the disclosure and the terms used herein do not limit the technology described in the disclosure to specific forms, and should be construed to include various modifications, equivalents, and/or replacements of the embodiments.

The terms of a singular form may include plural forms unless otherwise specified.

In the disclosure disclosed herein, the expressions "A or B", or "at least one of A or/and B", "A, B, or C", or "at least one of A, B, or/and C", and the like used herein may include any and all combinations of one or more of the associated listed items.

The terms, such as "first", "second", and the like used herein may refer to various elements of various embodiments of the disclosure, but do not limit the elements. For example, such terms are used only to distinguish an element from another element and do not limit the order and/or priority of the elements.

If it is mentioned that an element (e.g., a first element) is (functionally or communicatively) "connected" to another element (e.g., a second element), the first element may be directly connected to the second element or may be connected to the second element through another element (e.g., a third element).

In the disclosure, the expression "configured to" may be interchangeably used with, for example, "suitable for", "capable of", "modified to", "made to", "able to", or "designed to" according to a situation in a hardware or software way. In some situations, the expression "a device configured to" may mean that the device is "capable of" operating together with another device or other components. CPU, for example, a "processor configured to (or set to) perform A, B, and C" may mean a dedicated processor (e.g., an embedded processor) for performing a corresponding operation or a generic-purpose processor (e.g., a CPU or an AP) which may perform corresponding operations by executing one or more programs which are stored in a memory device.

The term "module" used in the disclosure may include a unit configured in a hardware, software, or firmware way, and for example, may be used interchangeably with the terms such as logic, a logic block, a component, or a circuit. The "module" may be an integral component, or a minimum unit or a part which performs one or more functions. The "module" may be implemented mechanically or electronically, and for example, may include an application-specific integrated circuit (ASIC) chip, field-programmable gate arrays (FPGAs), or a programmable logic device that is known or to be developed in the future, which performs some operations.

At least some of the devices (e.g., modules or functions) or methods (e.g., operations) according to various embodiments of the disclosure may be implemented by an instruction stored in a computer-readable storage medium, for example, in the form of a program module. When the instruction is executed by a processor, the processor may perform a function corresponding to the instruction. The computer-readable recording medium may include a hard disk, a floppy disk, a magnetic medium (e.g., a magnetic tape), an optical recording medium (e.g., a compact disc (CD)-read only memory (ROM) or a digital versatile disc (DVD)), an magneto-optical medium (e.g., a floptical disk), and an embedded memory. The instruction may include a code made by a compiler or a code that may be executed by an interpreter.

Each of the elements (e.g., a module or a program) according to various embodiments may include a single or a plurality of entities, and some of the corresponding sub-elements may be omitted or another sub-element may be further included in various embodiments. Alternatively or additionally, some elements (e.g., a module or a program module) may be integrated into one entity to perform functions performed by the corresponding elements before the integration in the same way or similarly. The operations performed by a module, a program module, or another element according to various embodiments may be executed sequentially, in parallel, repeatedly, or heuristically, or at least some operations may be executed in another sequence or may be omitted, or another operation may be added.

An electronic device according to the above-described embodiments of the disclosure may include a second sensor panel including a first circuit board providing a receiving space and a second circuit board accommodated in the receiving space of the first circuit board. Accordingly, even though waving is generated after the first attachment process of one of the first circuit board or the second circuit board, the second attachment process may be performed because the position and angle of the other circuit board are adjustable within the receiving space.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
    a housing;
    a display; and
    a sensor panel disposed between the display and the housing and configured to sense input information of a stylus pen,
    wherein the sensor panel includes:
        a first sensor panel including an opening area, and
        a second sensor panel disposed to cover at least part of the opening area and electrically connected with the first sensor panel, and
    wherein the second sensor panel includes:
        a first circuit board including a first sub-board and a second sub-board, at least part of the first sub-board and at least part of the second sub-board being spaced apart from each other to form a receiving space, and a second circuit board, at least part of which being accommodated in the receiving space and surrounded by the first circuit board.

2. The electronic device of claim 1, wherein the first sensor panel includes:

a plurality of first conductive lines, and a plurality of second conductive lines disposed to cross each other in a remaining area of the first sensor panel, other than the opening area, wherein the first circuit board further includes a plurality of first bridge lines configured to electrically connect the first conductive lines separated by the opening area, and wherein the second circuit board includes a plurality of second bridge lines configured to electrically connect the second conductive lines separated by the opening area.

3. The electronic device of claim 2, wherein the plurality of first bridge lines are disposed on at least one of the first sub-board or the second sub-board.

4. The electronic device of claim 2, wherein the first circuit board further includes:

a plurality of first contact pads disposed on a first extending area extending in a first direction further than the second circuit board; and a plurality of second contact pads disposed on a second extending area extending in a second direction opposite to the first direction further than the second circuit board, and wherein the second circuit board further includes:

a plurality of third contact pads disposed on a third extending area extending in a third direction crossing the first direction further than the first circuit board; and a plurality of fourth contact pads disposed on a fourth extending area extending in a fourth direction opposite to the third direction further than the first circuit board.

5. The electronic device of claim 4, wherein between the first contact pads and the second contact pads, the first bridge lines electrically connect the first contact pads and the second contact pads, and wherein between the third contact pads and the fourth contact pads, the second bridge lines electrically connect the third contact pads and the fourth contact pads.

6. The electronic device of claim 1, further comprising:

a through-hole formed through the first sub-board, the second sub-board, and the second circuit board; and a fixing holder member inserted into the through-hole.

7. The electronic device of claim 6, wherein the through-hole includes:

a first through-hole formed through the first sub-board;

a second through-hole formed through the second sub-board; and a third through-hole formed through the second circuit board, and wherein the third through-hole has a larger diameter than at least one of the first through-hole or the second through-hole.

8. The electronic device of claim 6, wherein the fixing holder member includes:

a first holder area configured to face the first sub-board, the first holder area having a larger diameter than the first through-hole;

a second holder area configured to face the second sub-board, the second holder area having a larger diameter than the second through-hole; and a third holder area inserted into the first to third through-holes, the third holder area having a smaller diameter than the first to third through-holes.

9. The electronic device of claim 6, wherein the fixing holder member is formed of a rubber material.

10. The electronic device of claim 6, further comprising:

a fingerprint sensor disposed between the second sensor panel and the display; and a sensor circuit board connected with the fingerprint sensor.

11. The electronic device of claim 10, wherein the fixing holder member is disposed at a center of the fingerprint sensor or at a center of an overlapping area of the first sub-board and the second sub-board.

12. The electronic device of claim 10, further comprising:

a first contact prevention member disposed between a front surface of the first sub-board configured to face toward the display and the fingerprint sensor; and a second contact prevention member disposed to surround at least one side of the first contact prevention member.

13. The electronic device of claim 12, wherein the second contact prevention member is thicker than the first contact prevention member.

14. The electronic device of claim 10, wherein a first separation distance between a first plurality of contact pads and a first alignment mark that are closer to the sensor circuit board is greater than a second separation distance between a second plurality of contact pads and a second alignment mark that are farther away from the sensor circuit board.

15. The electronic device of claim 1, further comprising a shielding layer disposed on a rear surface of the second sub-board configured to face toward the housing.

16. An electronic device, comprising:

a housing;

a display;

a sensor panel disposed between the display and the housing and configured to sense input information of a stylus pen; and a fingerprint sensor disposed between the sensor panel and the display, wherein the sensor panel includes:

a first sensor panel including an opening area, and a second sensor panel configured to overlap the fingerprint sensor and disposed to cover at least part of the opening area, the second sensor panel being electrically connected with the first sensor panel, and wherein the second sensor panel includes:

a first circuit board including a first sub-board and a second sub-board, at least part of the first sub-board and at least part of the second sub-board being spaced apart from each other to form a receiving space; and a second circuit board, at least part of which is accommodated in the receiving space and surrounded by the first circuit board, wherein a volume of the second circuit board in the receiving space is smaller than the receiving space.

17. The electronic device of claim 16, further comprising:

a through-hole formed through the first sub-board, the second sub-board, and the second circuit board; and a fixing holder member inserted into the through-hole.

18. The electronic device of claim 16, further comprising:
a first contact prevention member disposed between a front surface of the first sub-board configured to face toward the display and the fingerprint sensor; and
a second contact prevention member disposed to surround at least one side of the first contact prevention member.

19. The electronic device of claim 16, further comprising:
alignment marks disposed on the first circuit board and the second circuit board; and
a sensor circuit board connected with the fingerprint sensor,
wherein a first separation distance between a first plurality of contact pads and a first alignment mark that are closer to the sensor circuit board is greater than a second separation distance between a second plurality of contact pads and a second alignment mark that are farther away from the sensor circuit board.

20. The electronic device of claim 16, further comprising shielding layer disposed on a rear surface of the second sub-board configured to face toward the housing.

* * * * *